United States Patent
Zhang et al.

(10) Patent No.: US 10,079,452 B1
(45) Date of Patent: Sep. 18, 2018

(54) REMOVAL UNIT

(71) Applicant: FUJITSU COMPONENT LIMITED, Tokyo (JP)

(72) Inventors: Hongfei Zhang, Tokyo (JP); Shinichiro Akieda, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/914,276

(22) Filed: Mar. 7, 2018

(30) Foreign Application Priority Data

Mar. 15, 2017 (JP) ................. 2017-049595

(51) Int. Cl.
| | |
|---|---|
| *H01R 13/627* | (2006.01) |
| *H01R 13/633* | (2006.01) |
| *G02B 6/42* | (2006.01) |

(52) U.S. Cl.
CPC ....... *H01R 13/6335* (2013.01); *G02B 6/4284* (2013.01)

(58) Field of Classification Search
CPC .................................................. H01R 13/6335
USPC ......................................................... 439/352
See application file for complete search history.

(56) References Cited

U.S. PATENT DOCUMENTS

| | | | | |
|---|---|---|---|---|
| 6,439,918 B1 * | 8/2002 | Togami | ................ | G02B 6/4246 439/157 |
| 6,538,882 B2 * | 3/2003 | Branch | .............. | H01R 13/6275 361/679.02 |
| 6,851,867 B2 * | 2/2005 | Pang | .................... | G02B 6/3825 385/134 |
| 7,040,911 B1 * | 5/2006 | Ho | ........................ | G02B 6/4292 439/352 |
| 7,090,523 B2 * | 8/2006 | Shirk | .................... | G02B 6/4246 439/352 |
| 7,108,523 B2 * | 9/2006 | Hartman | ............ | H01R 13/6582 439/157 |
| 8,113,723 B2 * | 2/2012 | Togami | ................ | G02B 6/4246 385/53 |
| 8,506,172 B2 * | 8/2013 | Meadowcroft | ...... | G02B 6/4261 385/147 |
| 8,545,252 B2 * | 10/2013 | Wang | ................. | H01R 13/6275 439/352 |

(Continued)

FOREIGN PATENT DOCUMENTS

| | | |
|---|---|---|
| JP | 2014-500602 | 1/2014 |
| WO | 2015/190211 | 12/2015 |

*Primary Examiner* — Neil Abrams
(74) *Attorney, Agent, or Firm* — IPUSA, PLLC

(57) ABSTRACT

A removal unit includes a latch and a tab separably connectable to the latch. The latch includes latch arms each including a connection hole and an opening extending from the connection hole and being smaller than the connection hole. The tab includes a body, tab arms extending from the body, and protrusions provided on the tab arms to protrude toward each other. The protrusions each include a connecting part and an engaging part extending from the connecting part and being larger than the connection hole. The connecting part is provided on the tab arm, and configured to be placed into the connection hole. The connecting part has a width in a first direction smaller than the width of the opening and a length in a second direction perpendicular to the first direction smaller than the diameter of the connection hole and greater than the width of the opening.

5 Claims, 37 Drawing Sheets

(56) References Cited

U.S. PATENT DOCUMENTS

| | | | | |
|---|---|---|---|---|
| 8,562,373 B2* | 10/2013 | Wu | ............... | H01R 13/6335 |
| | | | | 439/352 |
| 9,001,515 B2* | 4/2015 | Tang | ............ | H01R 13/6335 |
| | | | | 361/728 |
| 9,071,003 B2 | 6/2015 | Lindkamp | | |
| 9,118,149 B2* | 8/2015 | Kappla | ............ | H01R 13/6275 |
| 9,250,402 B2* | 2/2016 | Ishii | ................. | G02B 6/4261 |
| 9,276,358 B2* | 3/2016 | Ista | .................. | G02B 6/42 |
| 9,348,101 B2* | 5/2016 | Wang | ............. | H01R 13/6335 |
| 9,411,111 B2* | 8/2016 | Banal, Jr. | ......... | G02B 6/4261 |
| 9,430,004 B2* | 8/2016 | Meadowcroft | ...... | G06F 1/183 |
| 9,929,500 B1* | 3/2018 | Ista | ................. | G02B 6/4261 |
| 2006/0078259 A1* | 4/2006 | Fuchs | ............ | G02B 6/4201 |
| | | | | 385/88 |
| 2011/0268390 A1* | 11/2011 | Yi | ................. | G02B 6/4201 |
| | | | | 385/50 |
| 2017/0090128 A1 | 3/2017 | Mori et al. | | |

\* cited by examiner

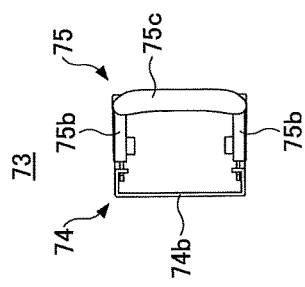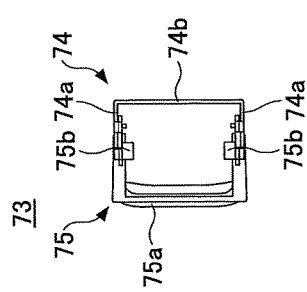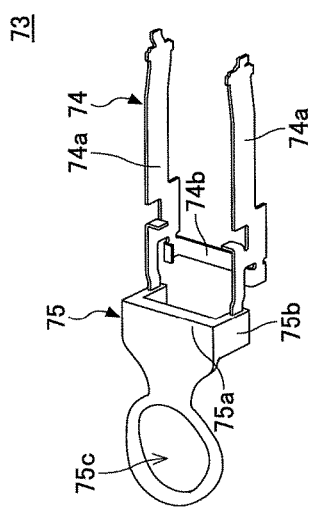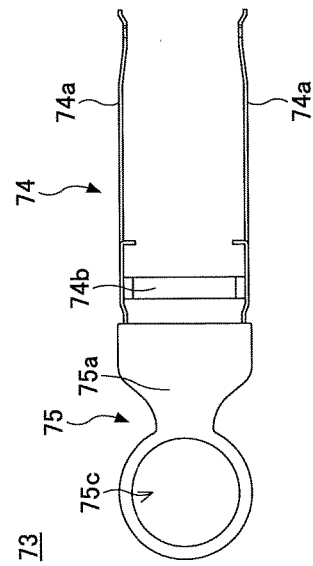

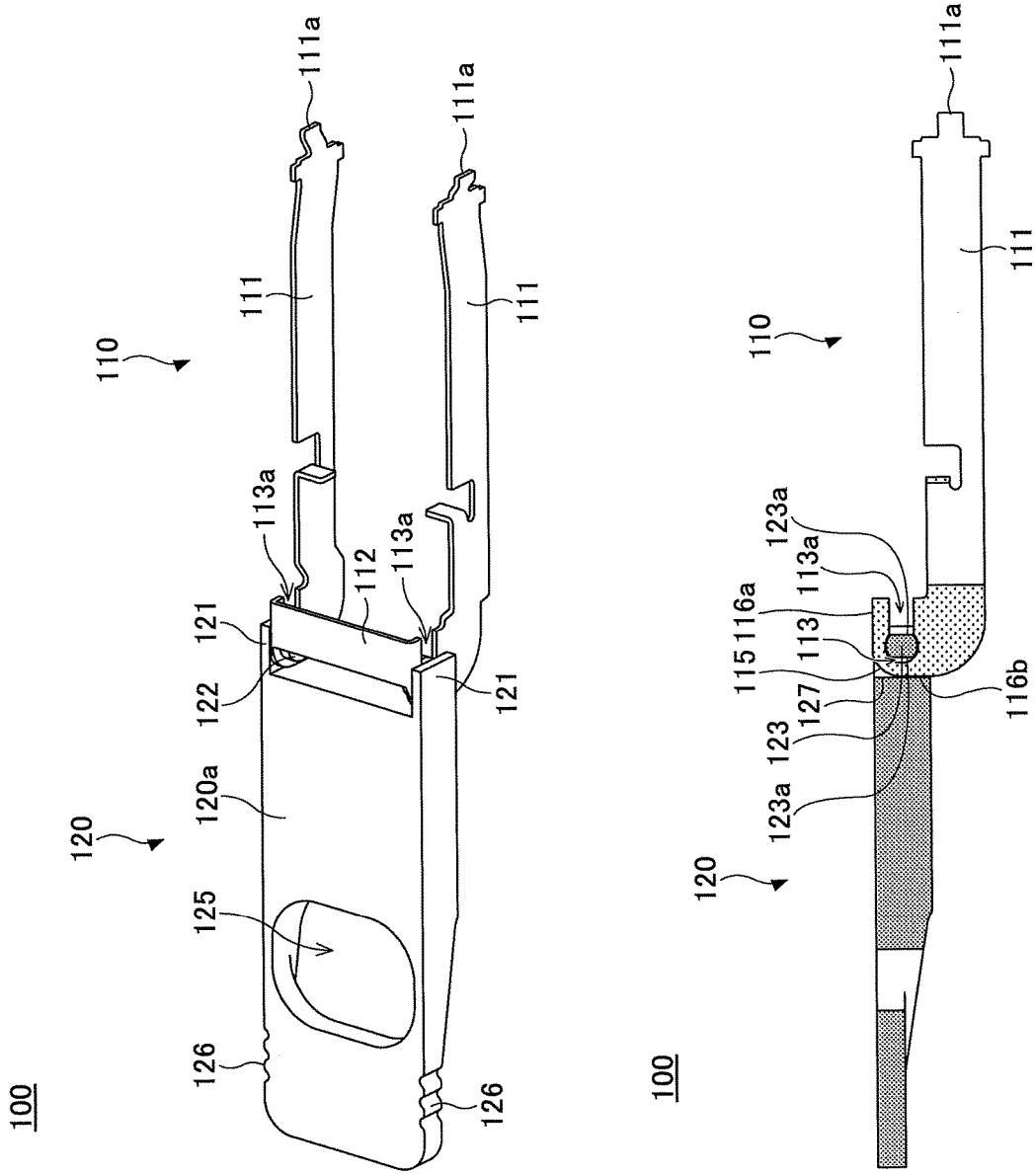

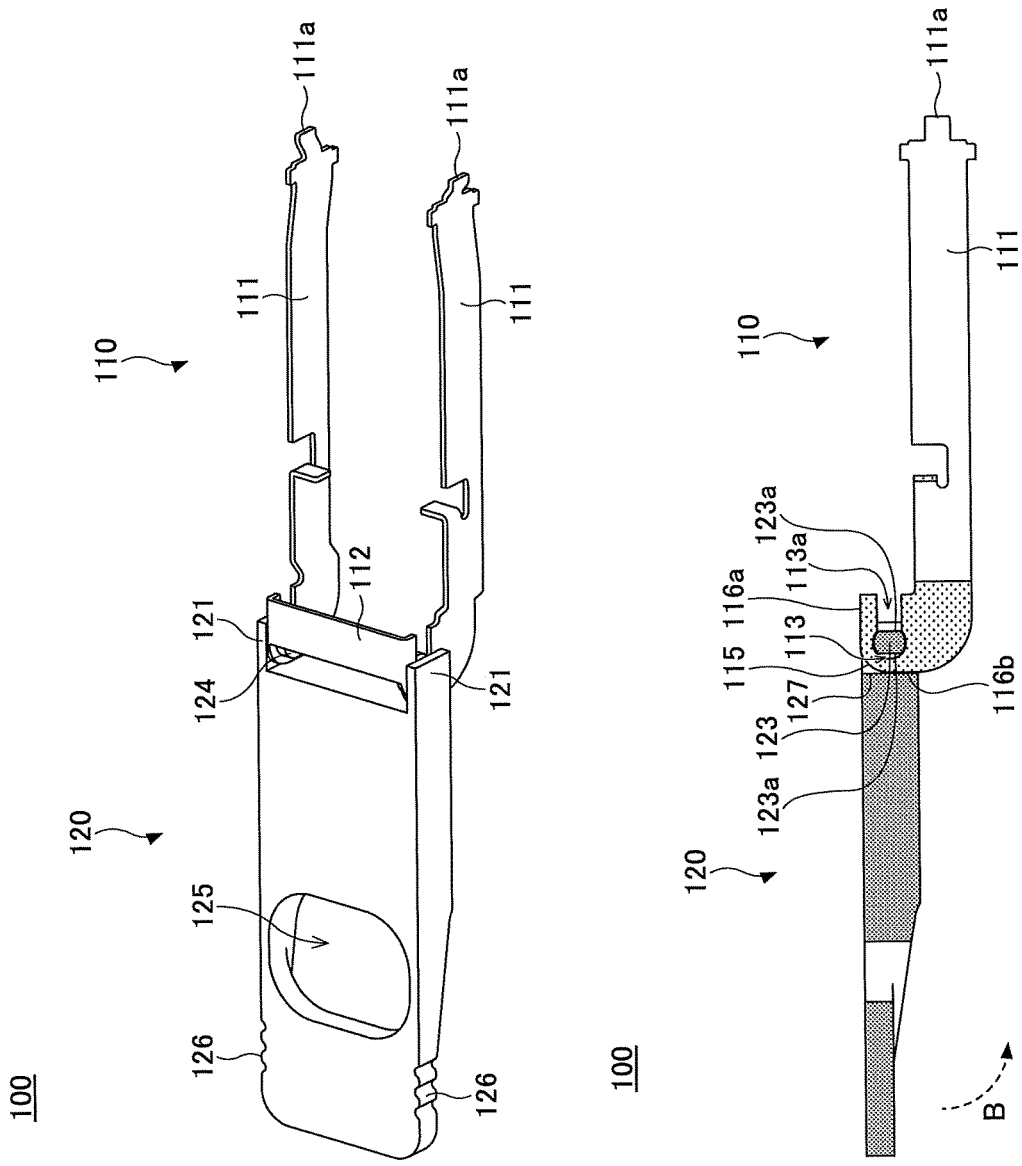

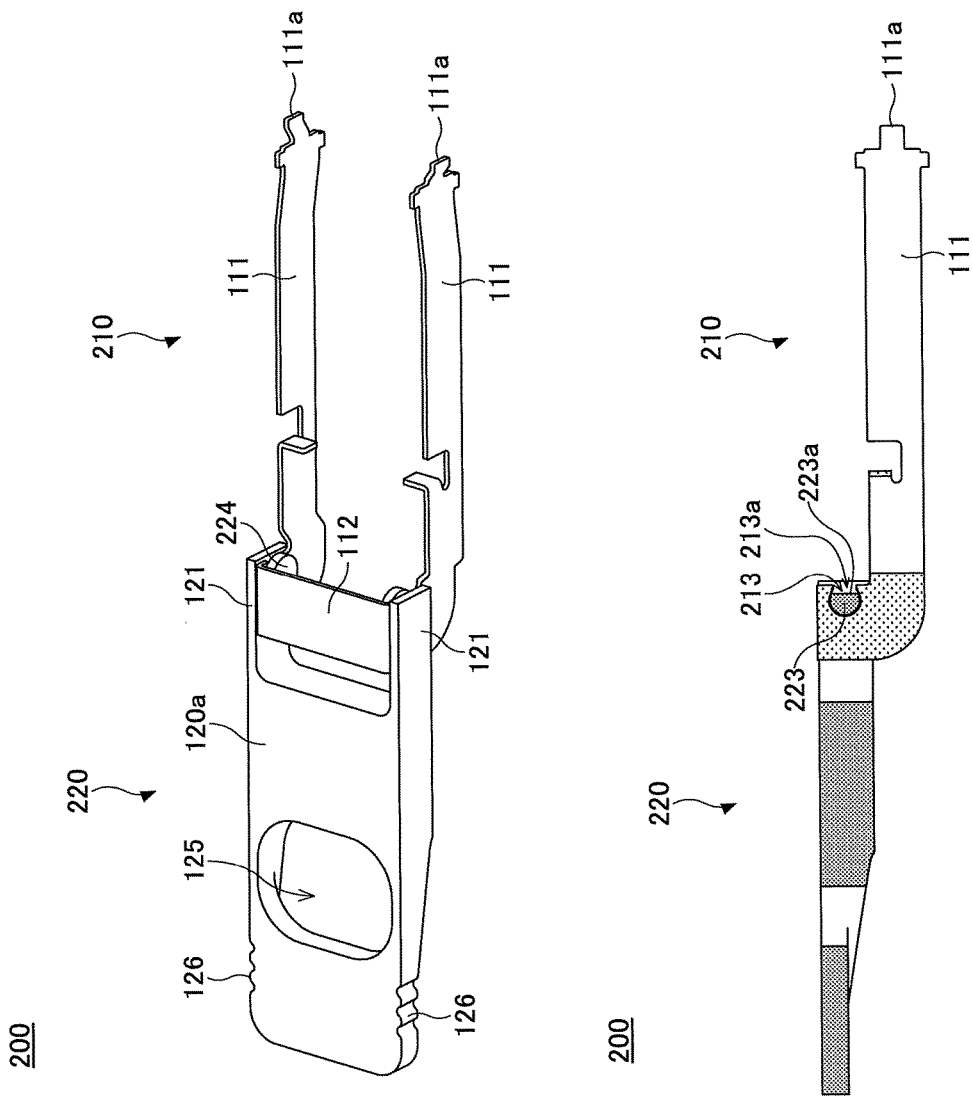

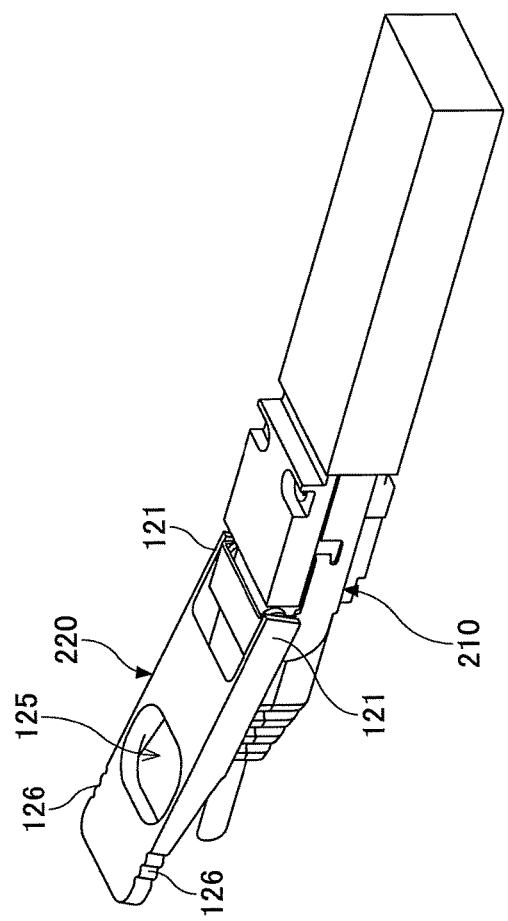
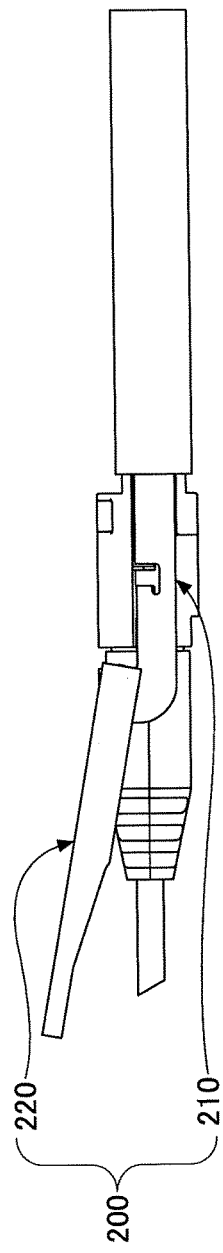
FIG.15A
FIG.15B

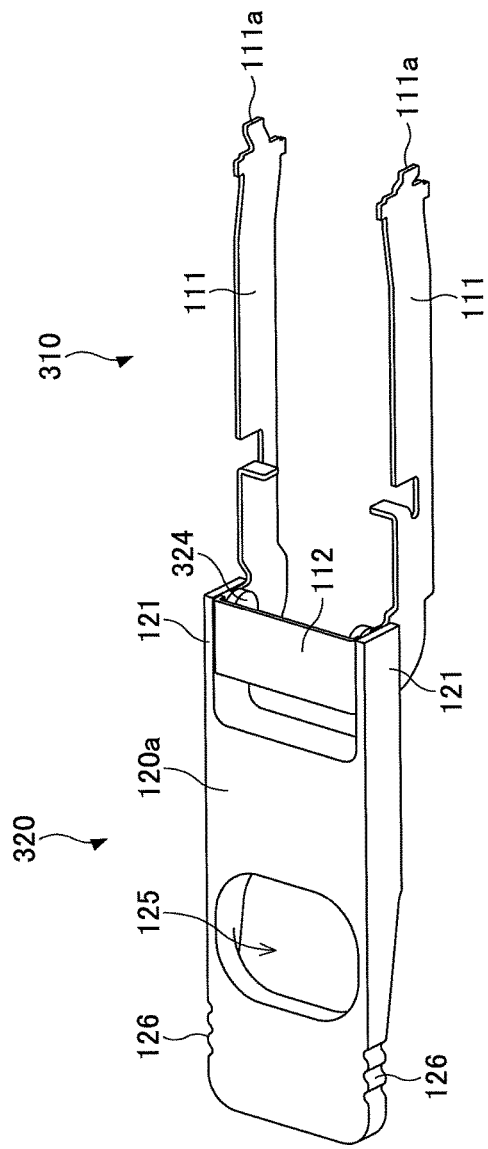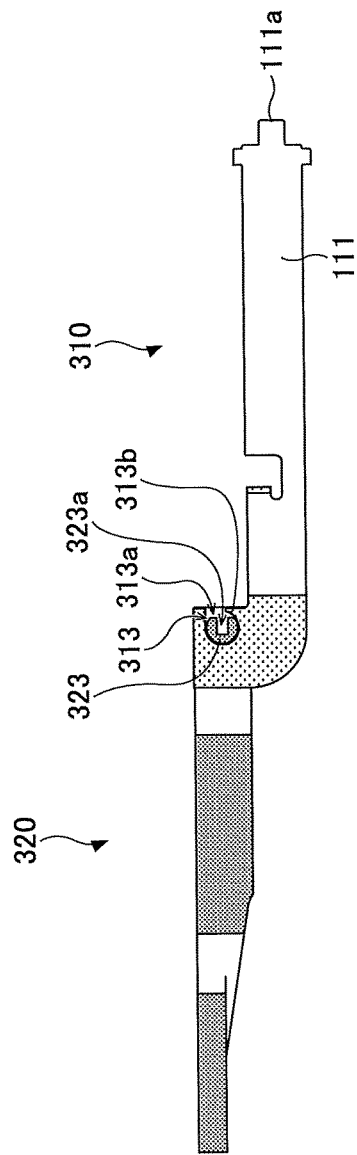
FIG.20A
FIG.20B

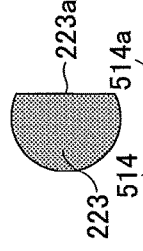
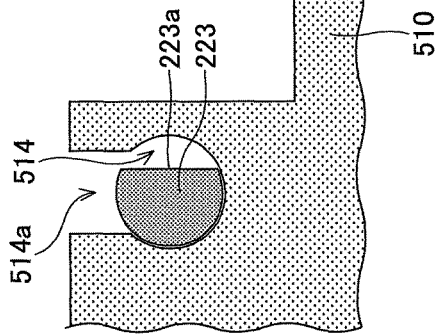
FIG.35B
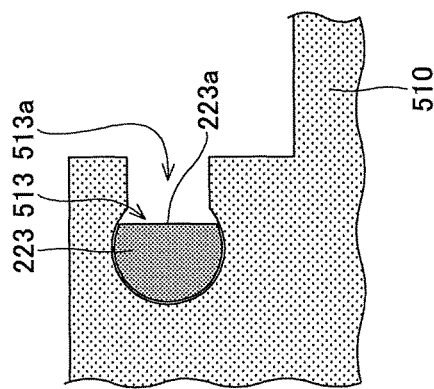
FIG.35A
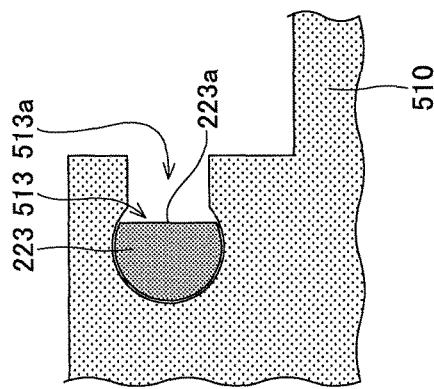
FIG.35D
FIG.35C

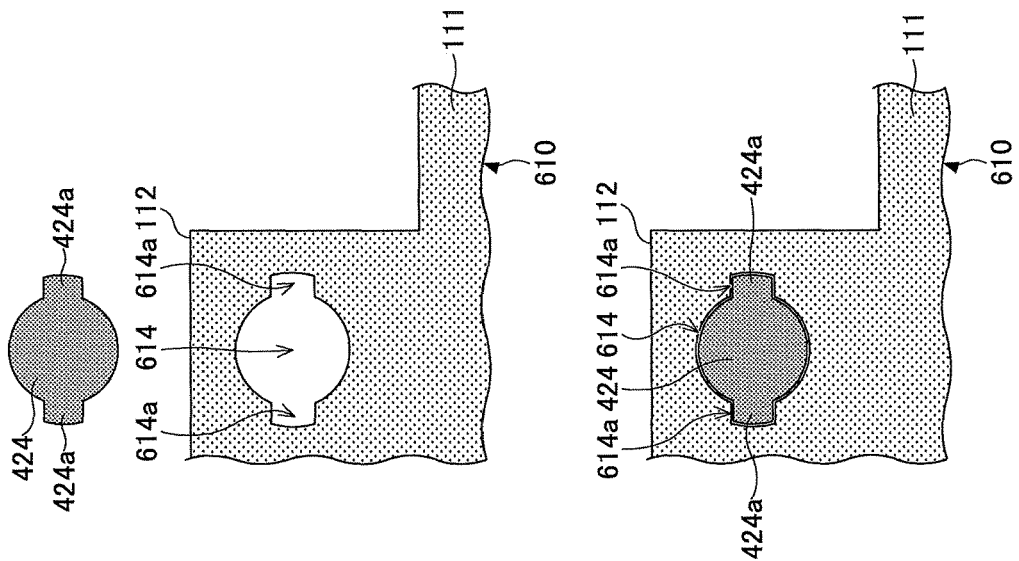
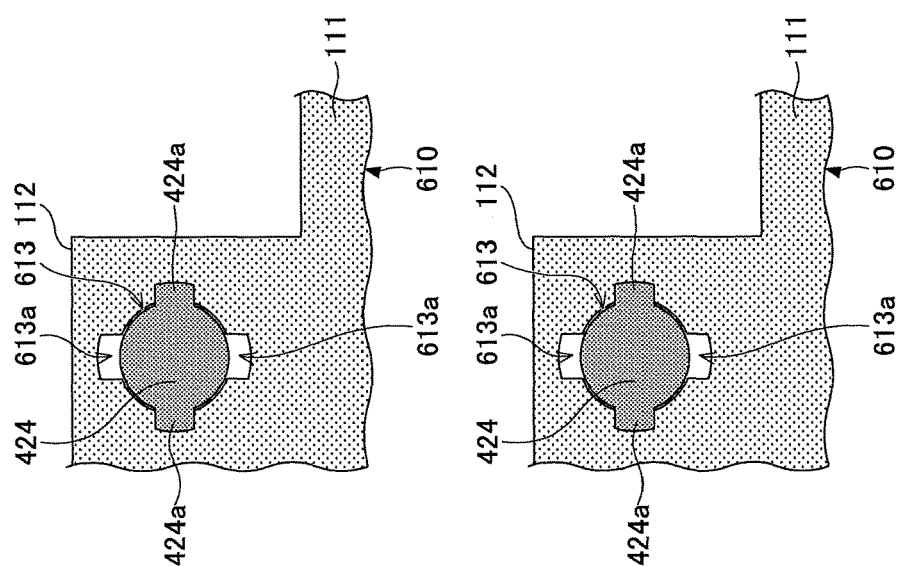

REMOVAL UNIT

CROSS-REFERENCE TO RELATED APPLICATION

The present application is based upon and claims priority to Japanese Patent Application No. 2017-049595, filed on Mar. 15, 2017, the entire contents of which are incorporated herein by reference.

BACKGROUND OF THE INVENTION

1. Field of the Invention

The present invention relates to removal units.

2. Description of the Related Art

Optical communications, which can increase a signal transmission rate and extend a transmission distance, are becoming popular as communications at high-speed interfaces of supercomputers and high-end servers.

For interfaces discussed in standards such as IBTA EDR (registered trademark) and 100G Ethernet (registered trademark), optical communications are employed, and an optical module is used. The optical module converts an optical signal into an electrical signal, and converts an electrical signal into an optical signal.

The optical module includes a light-emitting device, a light-receiving device, and a driver to drive the light-emitting device. The light-emitting device, the light-receiving device, and the driver are mounted on a circuit board, and the light-emitting device and the light-receiving device are connected to a ferrule with lenses by an optical waveguide.

An optical cable is connected to the optical module which connects to a connector provided on a back panel of a communications device. It is desired that optical modules be connected to back panel connectors at as high a density as possible. Therefore, the optical module is provided with a removal unit such as a pull tab to facilitate its removal from the connector.

Reference may be made to Japanese Patent No. 5866080 and Japanese National Publication of International Patent Application No. 2014-500602 for related art.

SUMMARY OF THE INVENTION

According to an aspect of the present invention, a removal unit includes a latch and a tab separably connectable to the latch. The latch includes latch arms each including a connection hole and an opening extending from the connection hole and being smaller than the connection hole. The tab includes a body, tab arms extending from the body, and protrusions provided on the tab arms to protrude toward each other. The protrusions each include a connecting part and an engaging part extending from the connecting part and being larger than the connection hole. The connecting part is provided on the tab arm, and configured to be placed into the connection hole. The connecting part has a width in a first direction smaller than the width of the opening and a length in a second direction perpendicular to the first direction smaller than the diameter of the connection hole and greater than the width of the opening.

BRIEF DESCRIPTION OF THE DRAWINGS

FIGS. 2A through 2D are a perspective view, a front view, a plan view and a rear view, respectively, of a removal unit;

FIGS. 5A and 5B are diagrams illustrating a removal unit according to a first embodiment;

FIGS. 11A and 11B are diagrams illustrating the method of connecting a latch and a tab according to the first embodiment;

FIGS. 12A and 12B are diagrams illustrating a removal unit according to a second embodiment;

FIGS. 15A and 15B are diagrams illustrating an optical module according to the second embodiment;

FIGS. 20A and 20B are diagrams illustrating a removal unit according to a third embodiment;

FIGS. 35A through 35D are diagrams illustrating the method of connecting a latch and a tab according to the fifth embodiment;

FIGS. 37A through 37D are diagrams illustrating the method of connecting a latch and a tab according to the sixth embodiment.

DESCRIPTION OF THE EMBODIMENTS

Figure 1:
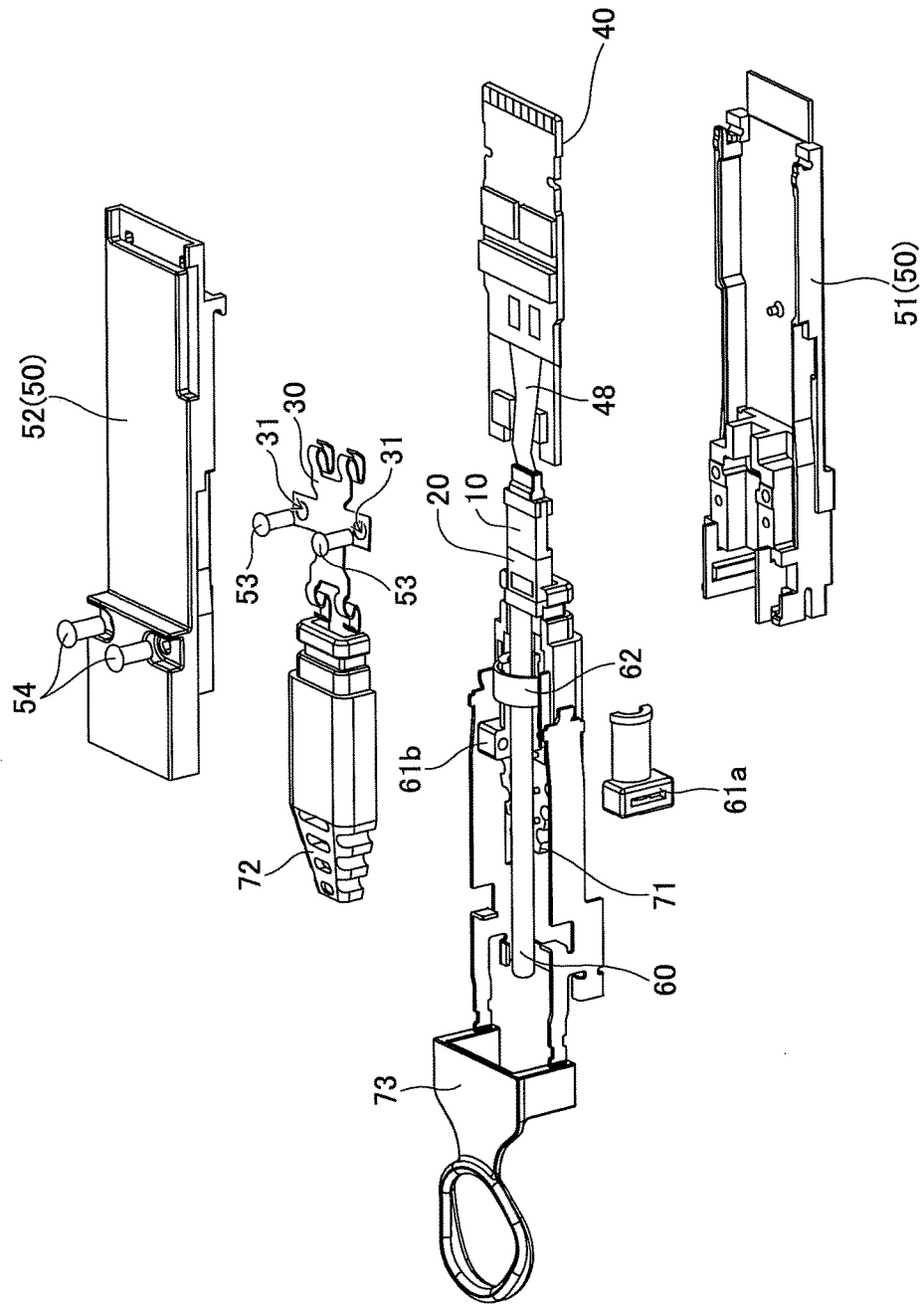
FIG. 1 is an exploded perspective view of an optical module.

The removal unit includes a latch and a tab to be pulled by, for example, a finger. When attaching the removal unit to the optical module, the tab gets in the way to make it difficult to attach the removal unit. Furthermore, it is impossible to replace only the tab because the tab is integrally formed with the latch.

According to an aspect of the present invention, a removal unit including a latch and a tab that are easily connectable and disconnectable is provided.

Embodiments of the present invention are described below with reference to the accompanying drawings. In the following description, the same elements are referred to using the same reference numeral, and are not repetitively described.

First Embodiment

An optical module to which a removal unit including a latch and a tab that are integrally formed is attached is described with reference to FIG. 1.

According to the optical module depicted in FIG. 1, a ferrule with lenses ("lens ferrule") 10 and a mechanically transferable (MT) ferrule 20; a printed board 40 ("board 40"); and an optical waveguide 48 are accommodated in a housing 50 formed of a lower case 51 and an upper case 52. An optical cable 60 is connected to the optical module. The lens ferrule 10 and the MT ferrule 20 are fixed by a clip 30, being aligned with each other by guide pins.

The printed board 40 is provided with a connector for connecting a flexible printed circuit (FPC) is connected. A light-emitting device to convert an electrical signal into an optical signal such as a vertical cavity surface emitting laser (VCSEL) and a light-receiving device to convert an optical signal into an electrical signal such as a photodiode are mounted on the FPC. A driver integrated circuit (IC) to drive the light-emitting device, a transimpedance amplifier (TIA) to convert electric current output from the light-receiving device into voltage, and connection terminals for external connection are provided on the board 40. The board 40 is placed in the lower case 51.

The sheet-shaped, flexible optical waveguide 48 is connected to the FPC and the lens ferrule 10.

The clip 30 has screw holes 31, and is screwed to the lower case 51 using screws 53. As a result, the lens ferrule 10 and the MT ferrule 20 are fixed to the lower case 51 through the clip 30.

Sleeves 61a and 61b are fixed to the optical cable 60 with a crimp ring 62. Cable boots 71 and 72 are placed over the optical cable 60 to which the sleeves 61a and 61b are fixed, and a removal unit 73 is attached to the housing 50.

With the lens ferrule 10 and the MT ferrule 20 fixed to the lower case 51 through the clip 30 and with the board 40 placed in the lower case 51, the upper case 52 is fastened to the lower case 51 with screws 54.

Figure 3:
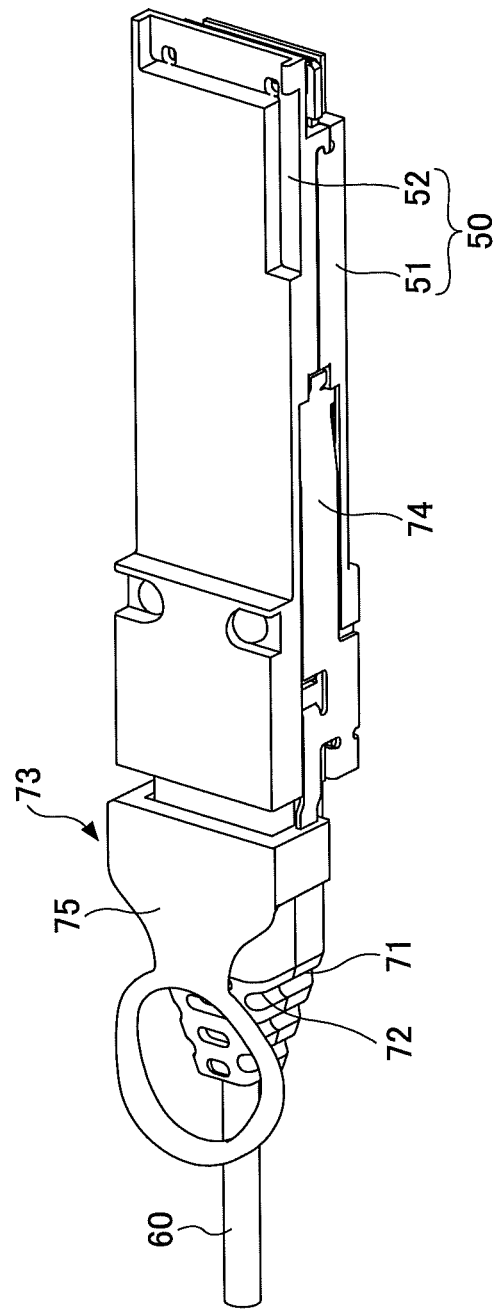
FIG. 3 is a perspective view of an optical module in which the removal unit is attached.

FIGS. 2A, 2B, 2C and 2D are a perspective view, a front view, a plan view and a rear view, respectively, of the removal unit 73. FIG. 3 is a perspective view of the optical module having the removal unit 73 attached to the housing 50.

Referring to FIGS. 2A through 2D, the removal unit 73 includes a latch 74 made of a metal and a tab 75 made of a resin.

The latch 74 includes two arms 74a to support side surfaces of the housing 50, and a beam 74b. The arms 74a are elongated in a removal direction of the optical module. A connecting part to be connected to the housing 50 is formed in each arm 74a near its first end. A second end of each arm 74a is connected to the beam 74b.

The tab 75 includes a body 75a, connecting parts 75b provided one on each side of the body 75a, and a hole 75c for inserting a finger to remove the optical module. The tab 75 has the connecting parts 75b connected to the latch 74. The removal unit 73 is formed by insert molding to have the latch 74 and the tab 75 integrally formed. The arms 74a are connected and fixed to the connecting parts 75b.

The beam 74b is elongated to be perpendicular to an extension direction of the arms 74a, that is, the removal direction. The latch 74 is attached to the housing 50 so that the beam 74b is below the housing 50. The tab 75 is positioned above the cable boots 71 and 72 connected to the housing 50.

Figure 4A:
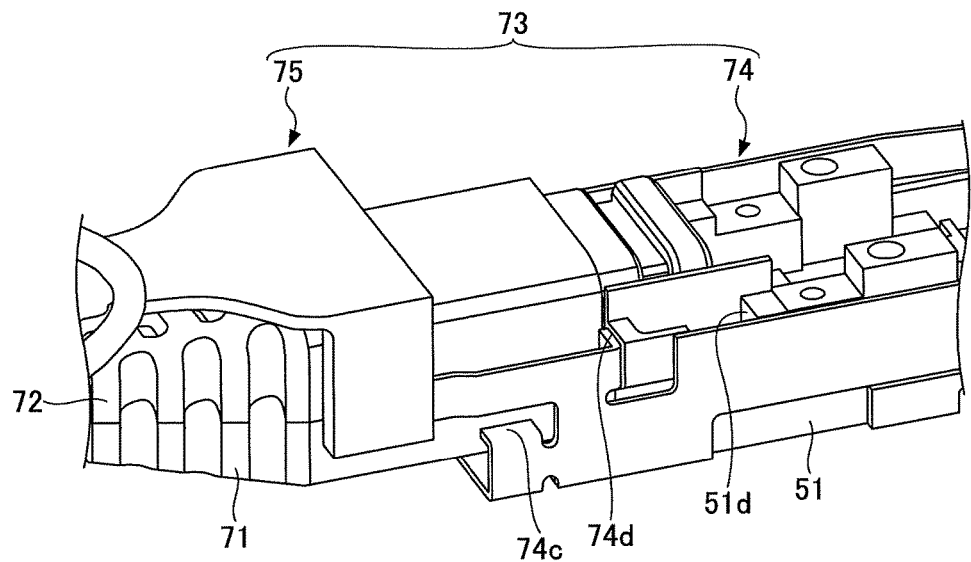
FIGS. 4A and 4B are diagrams illustrating a method of attaching the removal unit to the housing of the optical module.
Figure 4B:
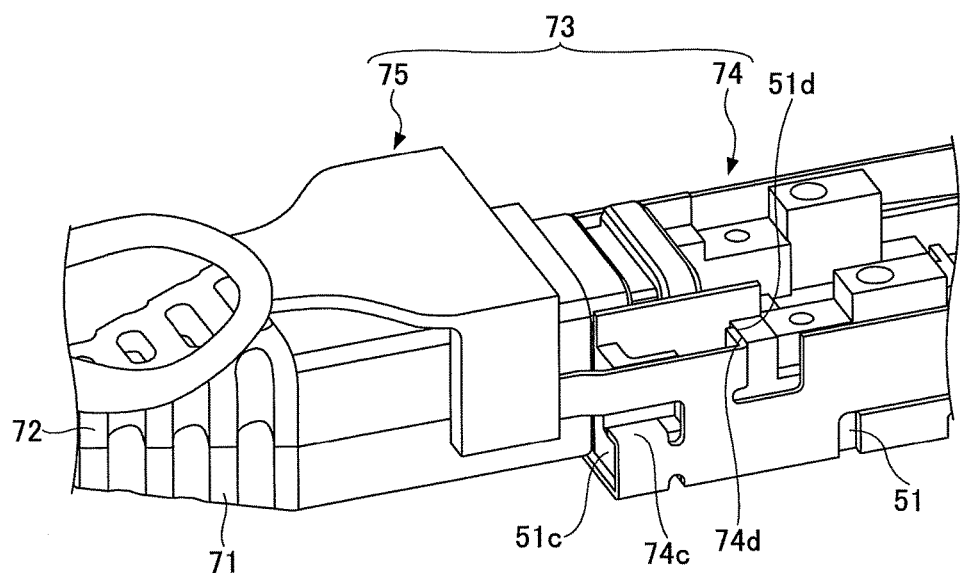

When attaching the removal unit 73 to the housing 50, the lower case 51 is inserted into a region surrounded by the arms 74a, the beam 74b, the body 75a, and the connecting parts 75b depicted in FIG. 2D. This work takes time, thus making the removal unit 73 difficult to attach. FIGS. 4A and 4B are diagrams illustrating a method of attaching the removal unit 73 to the optical module. The cable boots 71 and 72 and the lower case 51 are placed between the latch 74 and the tab 75 as illustrated in FIG. 4A, and then the removal unit 73 is attached to the lower case 51 as illustrated in FIG. 4B. The removal unit 73 is connected to the lower case 51 so that projections 51c of the lower case 51 are placed inside bents 74c of the latch 74 and contact parts 74d of the latch 74 come into contact with contact parts 51d of the lower case 51. The tab 75 gets in the way of such attachment, thus making the attachment work troublesome.

If the latch and the tab are separable, the tab can be attached to the latch after the latch is attached to the housing. In this way, the attachment work can be performed smoothly. Furthermore, the tab can be replaced.

Figure 6A:
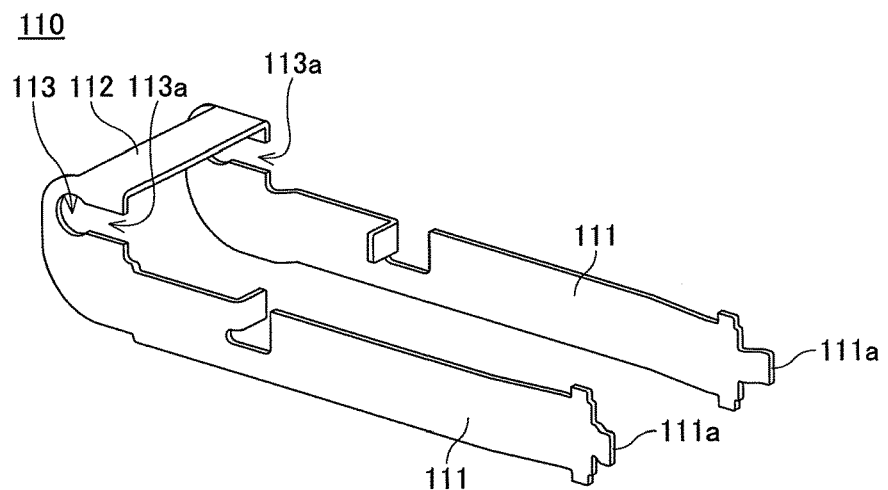
FIGS. 6A through 6C are diagrams illustrating a latch according to the first embodiment.
Figure 6B:
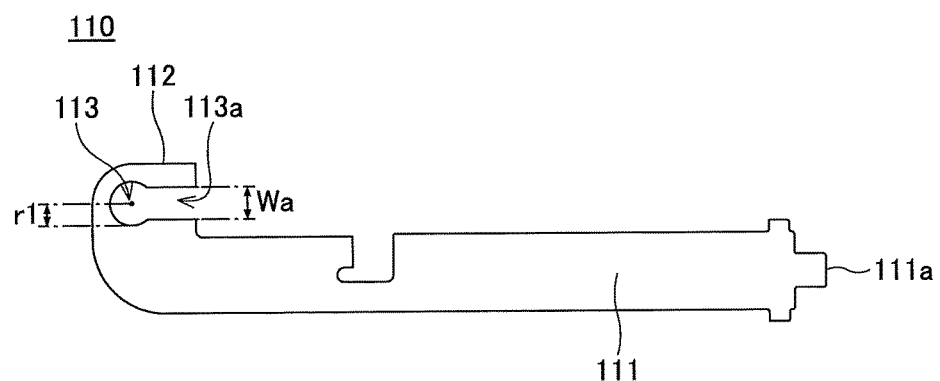
Figure 6C:
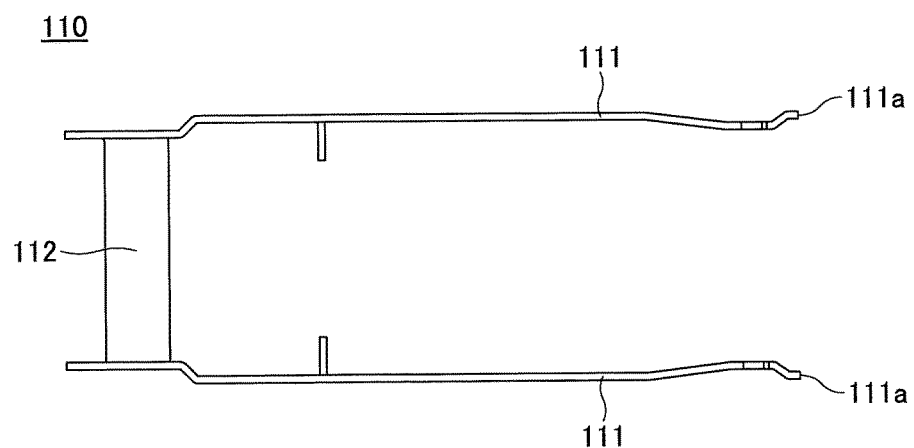
Figure 7A:
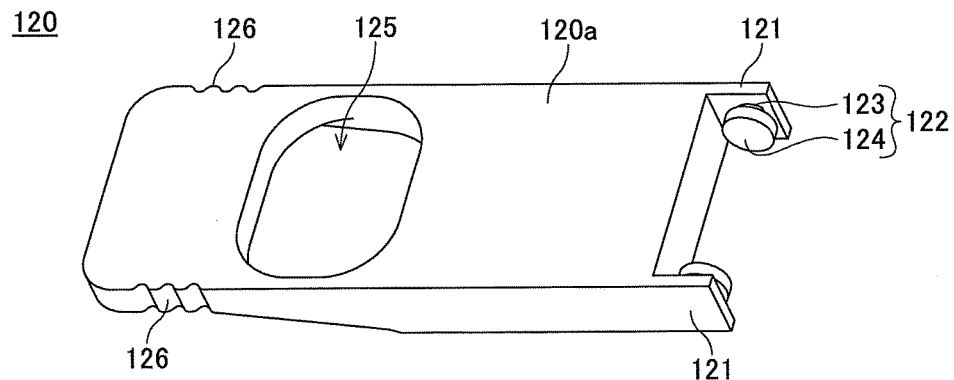
FIGS. 7A through 7C are diagrams illustrating a tab according to the first embodiment.
Figure 7B:
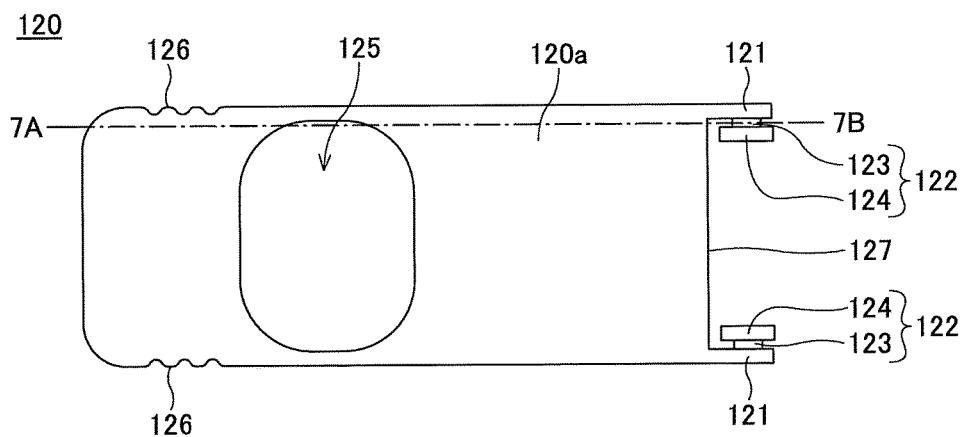
Figure 7C:
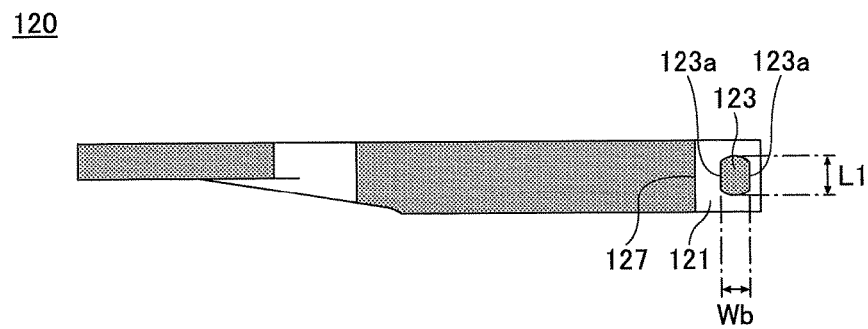

Next, a removal unit and an optical module according to a first embodiment are described with reference to FIGS. 5A and 5B, 6A through 6C, and 7A through 7C. FIGS. 5A and 5B are a perspective view and a cross-sectional view, respectively, of a removal unit 100. FIGS. 6A, 6B and 6C are a perspective view, a side view and a plan view, respectively, of a latch 110. FIGS. 7A and 7B are a perspective view and a plan view, respectively, of a tab 120. FIG. 7C is a cross-sectional view of the tab 120, taken along the one-dot chain line 7A-7B of FIG. 7B.

The removal unit 100 includes the latch 110 and the tab 120 which are separable. The latch 110 and the tab 120 may be made of the same material, but are preferably made of different materials in the light of functions of each component. The same applies to the latch and the tab of other embodiments. In the description of other embodiments, a description of the same configurations as those of this embodiment may be omitted.

The removal unit 100 is formed by connecting the latch 110 and the tab 120. The latch 110 is made of metal to have an angular U-letter shape. The latch 110 includes two arms 111 extending along a removal direction of an optical module, and a beam 112 connecting the two arms 111. A first end of each arm 111 serves as a connection part 111a to connect the latch 110 to a housing of the optical module. Second ends of the arms 111 are connected by the beam 112.

In part of each arm 111 near its connection to the beam 112, a connection hole 113 and an opening 113a extends from the connection hole 113 to be open in an extension direction of the arm 111 are provided. The connection hole 113 is circular except for where the opening 113a is formed. According to this embodiment, the connection hole 113 has a radius r1 of approximately 1.5 mm and the opening 113a has a width Wa of approximately 2.2 mm.

The tab 120 is formed of a resin as a one-piece structure. Alternatively, the tab 120 may be formed of a metal. The tab 120 includes a pair of arms 121 at a first end to connect the tab 120 to the latch 110. The arms 121 are provided on and extend from a body 120a of the tab 120. The tab 120 further includes protrusions 122 that are provided one on an inside surface of each arm 121 to protrude toward each other. Each protrusion 122 includes a connecting part 123 and an engaging part 124 extending from the connecting part 123. That is, the connecting part 123 is between the arm 121 and the engaging part 124. The engaging part 124 has, for example, a cylindrical shape of approximately 3.5 mm in diameter, while the connecting part 123 has a circular shape of approximately 2.8 mm in diameter, concentric with the engaging part 124, which is partly cut off linearly on opposite sides along the axis of the cylinder to define opposite cut surfaces 123a. The connecting part 123 is smaller than the engaging part 124.

According to this embodiment, a width Wb of each connecting part 123, namely, the distance between the cut surfaces 123a, is approximately 2.0 mm. Referring to FIG. 7C, the cut surfaces 123a extend in a direction substantially perpendicular to a lengthwise direction of the tab 120.

A hole 125 is formed in the body 120a, and irregularities 126 are formed on each side of the tab 120. The hole 125 is provided for inserting a finger when pulling out the optical module. The irregularities 126 are provided to prevent the optical module from slipping out of a hand when holding the sides of the tab 120 to pull out the optical module.

The latch 110 and the tab 120 are connected by placing the connecting parts 123 into the connection holes 113. A method of connecting the latch 110 and the tab 120 is described with reference to FIGS. 8A through 11B. FIGS. 8A, 9A, 10A and 11A are perspective views and FIGS. 8B, 9B, 10B and 11B are cross-sectional views of the latch 110 and the tab 120.

Figure 8A:
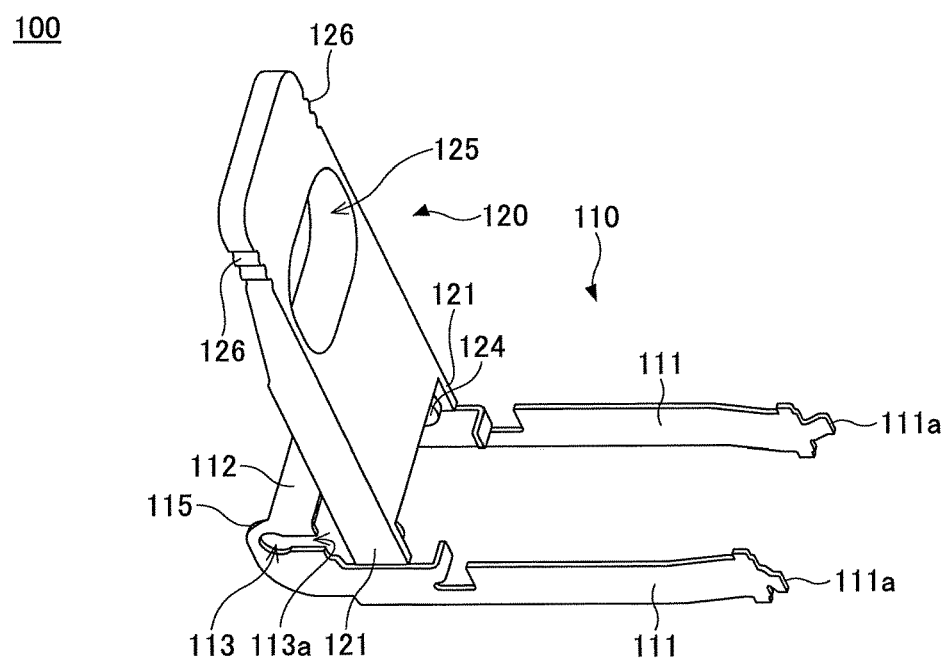
FIGS. 8A and 8B are diagrams illustrating a method of connecting a latch and a tab according to the first embodiment.
Figure 8B:
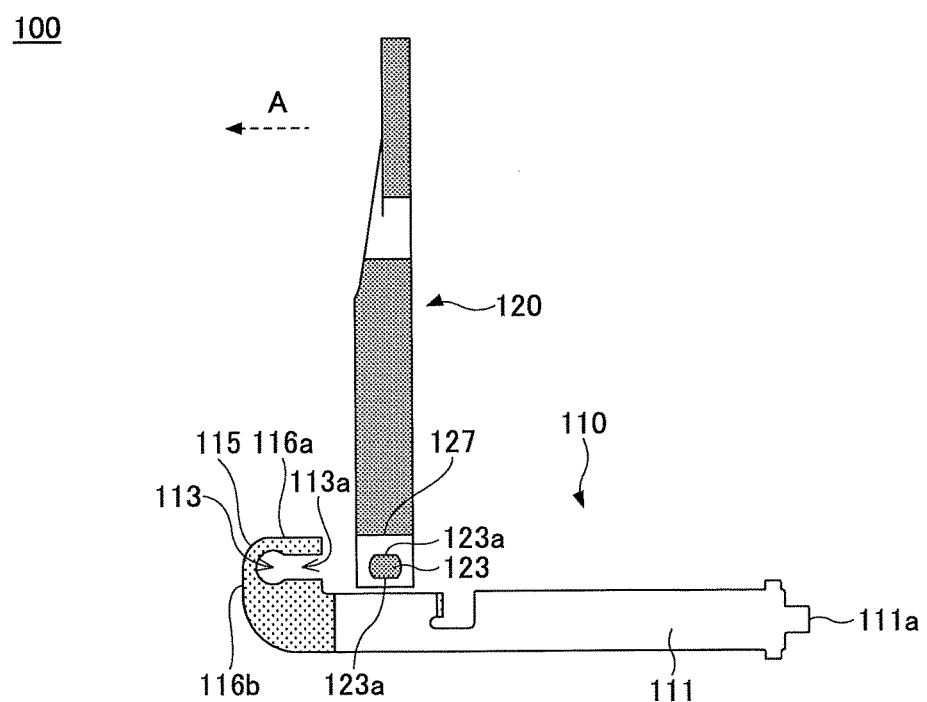

First, as illustrated in FIGS. 8A and 8B, the tab 120 is placed to be perpendicular to a lengthwise direction of the latch 110, and the connecting parts 123 are positioned on the opening 113a side of the connection holes 113. In this state, a lengthwise direction of the latch 110 is substantially parallel to a direction in which the cut surfaces 123a extend.

Figure 9A:
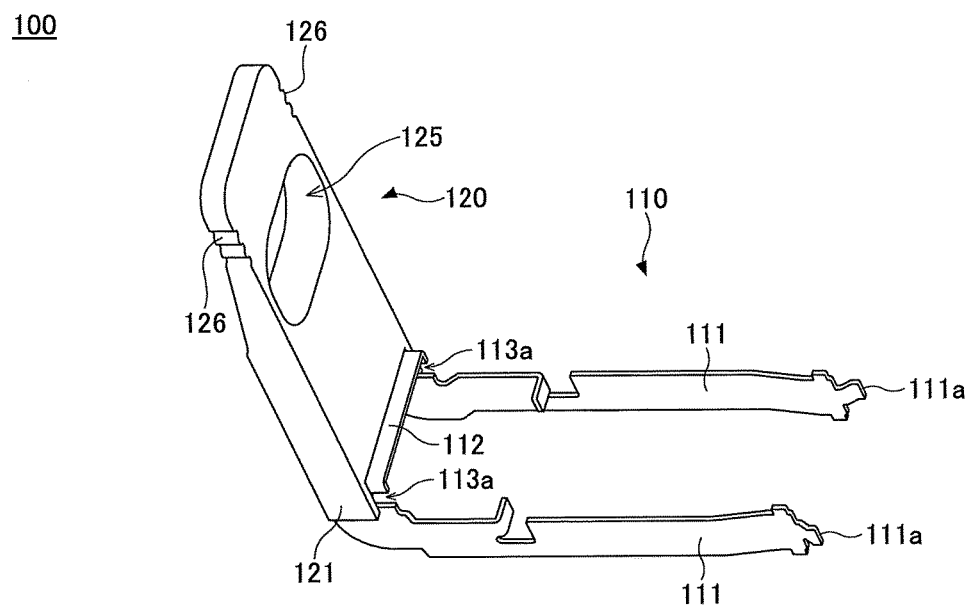
FIGS. 9A and 9B are diagrams illustrating the method of connecting a latch and a tab according to the first embodiment.
Figure 9B:
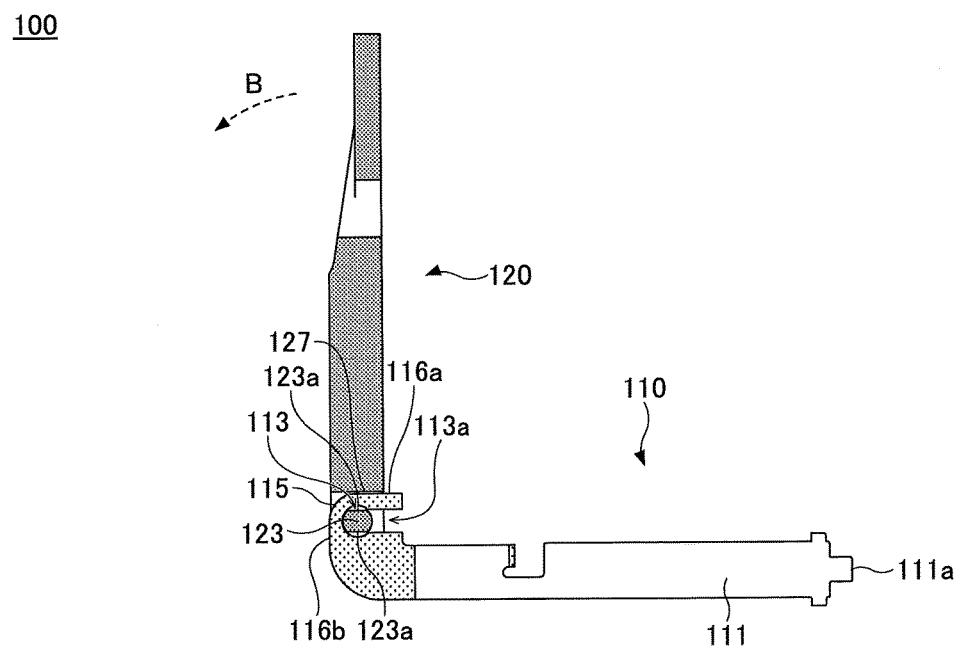

Thereafter, the tab 120 is moved in direction A in FIG. 8B to place the connecting parts 123 into the connection holes 113 through the openings 113a as illustrated in FIGS. 9A and 9B. The width Wb of the connecting parts 123 is smaller than the width Wa of the openings 113a. Therefore, the connecting parts 123 can enter the connection holes 113 through the openings 113a.

Figure 10A:
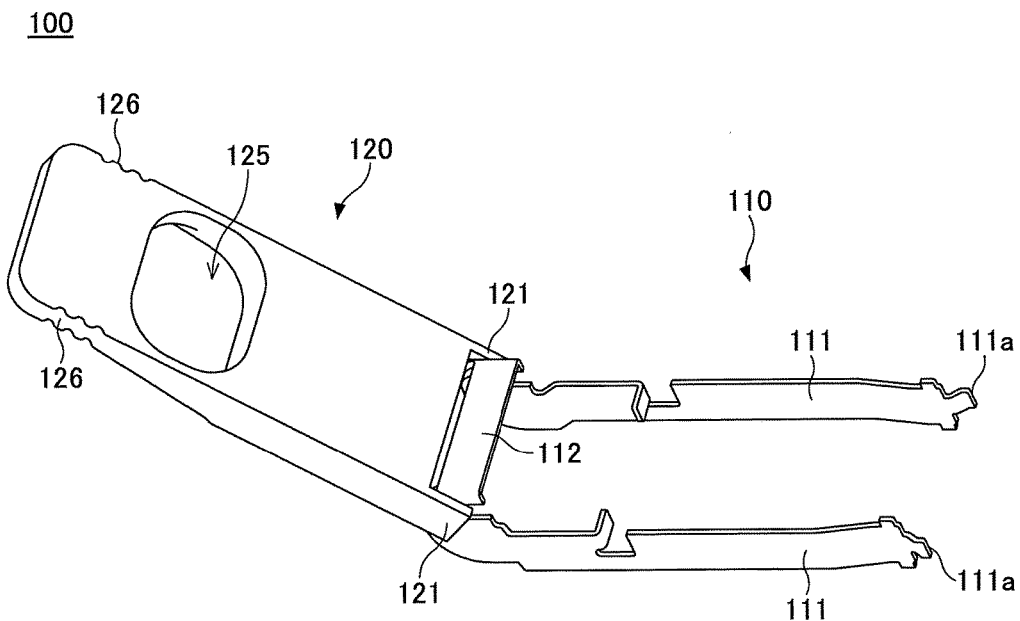
FIGS. 10A and 10B are diagrams illustrating the method of connecting a latch and a tab according to the first embodiment.
Figure 10B:
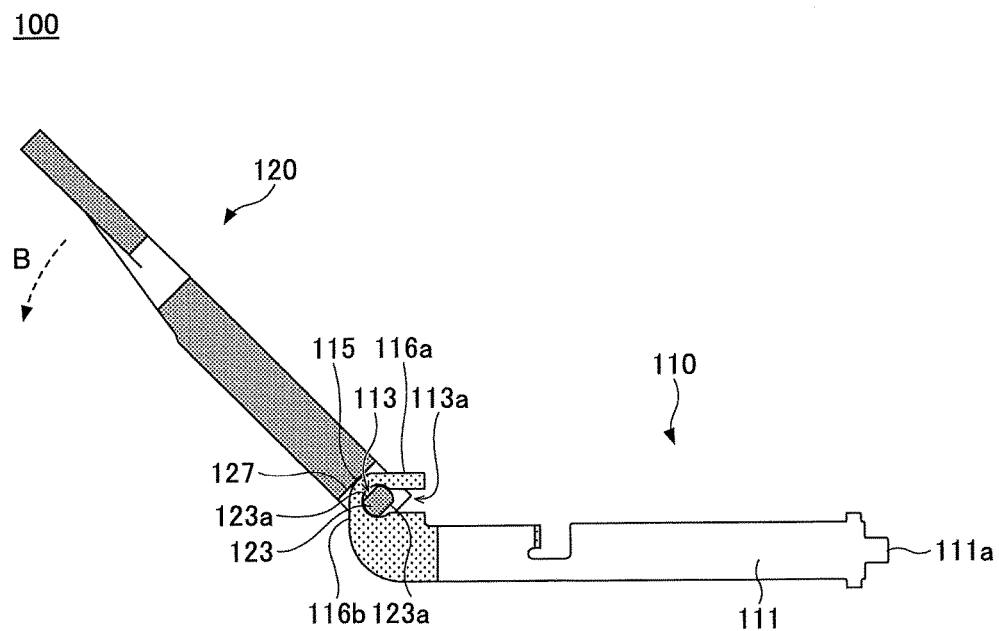

Next, with the connecting parts 123 placed in the connection holes 113, the tab 120 is pivoted in direction B in FIG. 9B. Each connection hole 113 has a circular shape except for where the opening 113a is formed, and each connecting part 123 is formed with a radius smaller than the radius of the connection hole 113. That is, a length L1 of the connecting part 123 is smaller than the diameter of the connection hole 113. Therefore, as illustrated in FIGS. 10A and 10B, the tab 120 can be pivoted in direction B while the connecting parts 123 are in the connection holes 113.

By pivoting the tab 120 further in direction B while the connecting parts 123 are in the connection holes 113, a lengthwise direction of the tab 120 can be substantially parallel to a lengthwise direction of the latch 110 as illustrated in FIGS. 11A and 11B. In this state, a lengthwise direction of the tab 120 is the same as the removal direction of the optical module. In this state, the optical module can be pulled out by inserting a finger into the hole 125 and pulling the tab 120.

According to this embodiment, the optical module can be pulled out by not only inserting a finger into the hole 125 but also holding the irregularities 126 provided on both sides of the tab 120.

According to this embodiment, the diameter of the engaging parts 124 is greater than the diameter of the connection holes 113. Therefore, the engaging parts 124 engage with the connection holes 113 to prevent the tab 120 from disengaging from the latch 110 in the state illustrated in FIGS. 10A, 10B, 11A and 11B.

The tab 120 is pivotable with the connecting parts 123. Therefore, the tab 120 is freely movable to a desired angle, and can be inclined relative to the latch 110. When pulling out the optical module, it is not always preferable to have the tab 120 substantially parallel to the latch 110 as illustrated in FIGS. 11A and 11B, and the optical module may be pulled out more easily with the tab 120 being inclined relative to the latch 110. This embodiment can address such a case as well.

When disengaging the tab 120 from the latch 110, the latch 110 and the tab 120 are moved to the state illustrated in FIGS. 10A and 10B and then to the state illustrated in FIGS. 9A and 9B. In the state where the latch 110 and the tab 120 are substantially perpendicular to each other as illustrated in FIGS. 9A and 9B, the connecting parts 123 can be moved out through the openings 113a. Thus, the tab 120 can be easily disengaged from the latch 110.

A contact surface 127 that contacts the latch 110 when the latch 110 and the tab 120 are connected is formed in the tab 120 near the protrusions 122. The tab 120 pivots with the contact surface 127 contacting a curved surface 115 of the latch 110 provided on the other side of the beam 112 from the connection parts 111a.

In the state illustrated in FIGS. 9A and 9B, the contact surface 127 contacts a surface 116a to prevent the tab 120 from pivoting further in a direction opposite to direction B. In the state illustrated in FIGS. 11A and 11B, the contact surface 127 contacts a surface 116b to prevent the tab 120 from pivoting further in direction B. Thus, it is possible to limit a range within which the tab 120 pivots. During a transition from the state illustrated in FIGS. 9A and 9B to the state illustrated in FIGS. 11A and 11B, that is, in the state illustrated in FIGS. 10A and 10B, the tab 120 pivots with the contact surface 127 contacting the surface 115. According to this embodiment, the surface 116a and the surface 116b are orthogonal to each other.

Second Embodiment

Next, a removal unit and an optical module according to a second embodiment are described with reference to FIGS. 12A through 15B.

Figure 13A:
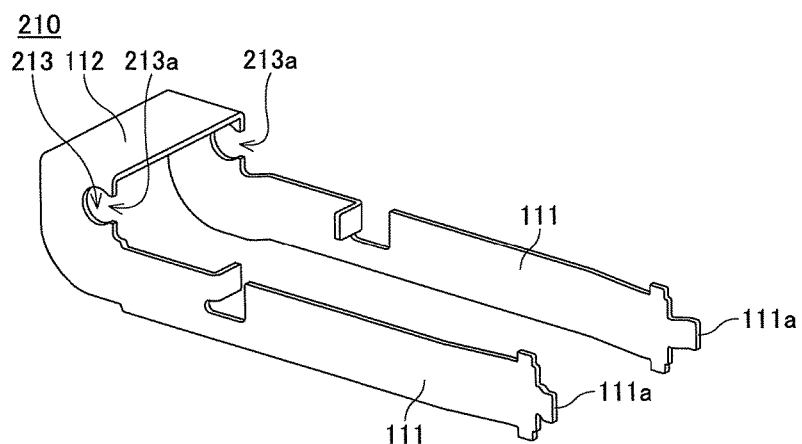
FIGS. 13A through 13C are diagrams illustrating a latch according to the second embodiment.
Figure 13B:
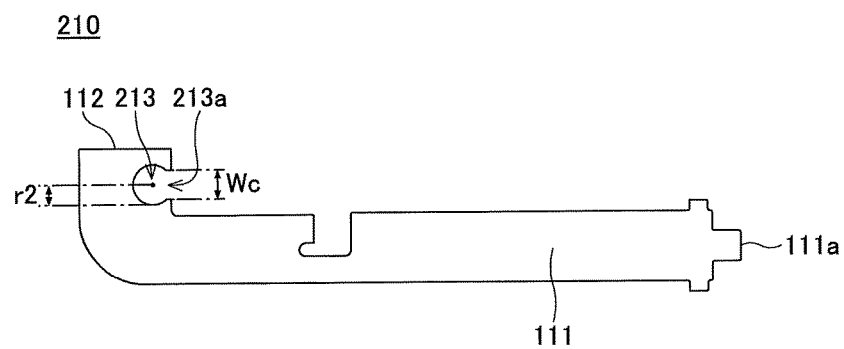
Figure 13C:
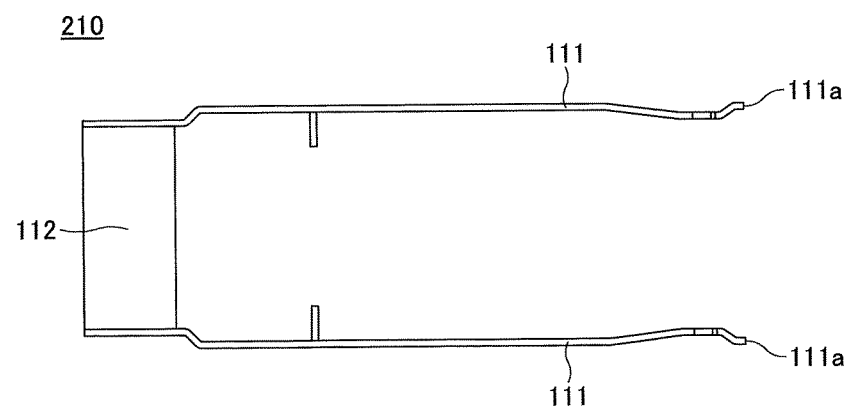
Figure 14A:
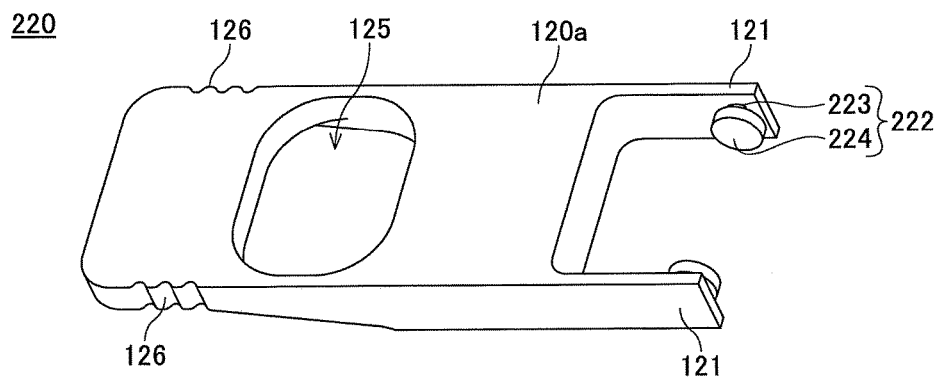
FIGS. 14A through 14C are diagrams illustrating a tab according to the second embodiment.
Figure 14B:
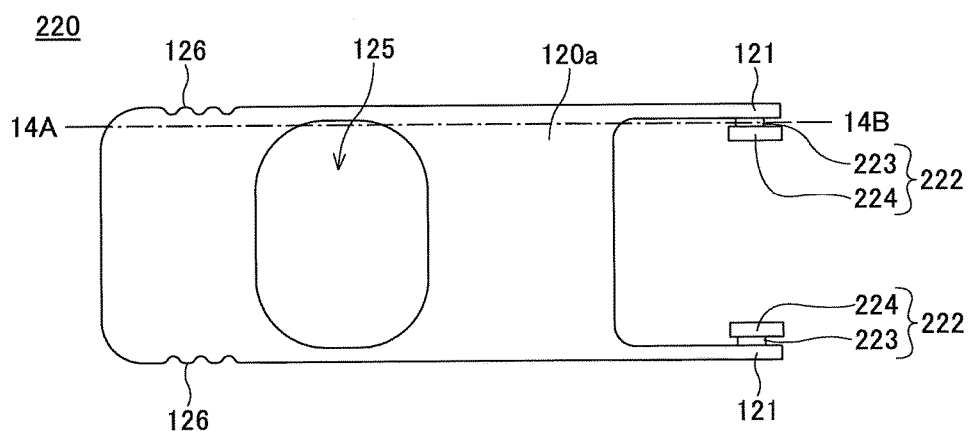
Figure 14C:
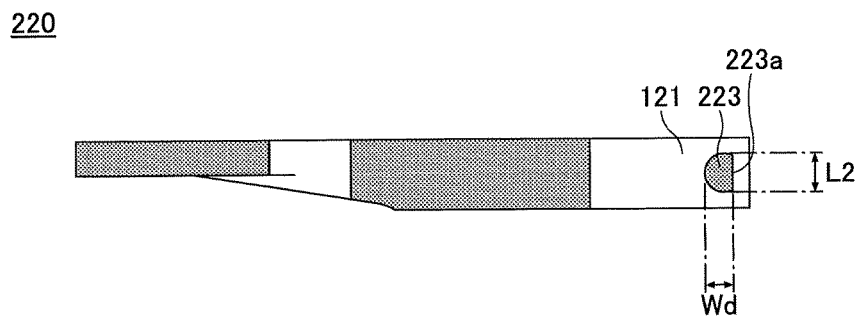

Referring to FIGS. 15A and 15B, a removal unit 200 including a latch 210 and a separable tab 220 is attachable to the optical component. FIGS. 12A and 12B are a perspective view and a cross-sectional view, respectively, of the latch 210 and the tab 220 that are connected. FIGS. 13A, 13B and 13C are a perspective view, a side view and a plan view, respectively, of the latch 210. FIGS. 14A and 14B are a perspective view and a plan view, respectively, of the tab 220. FIG. 14C is a cross-sectional view of the tab 220, taken along the one-dot chain line 14A-14B of FIG. 14B. FIGS. 15A and 15B are a perspective view and a side view, respectively, of the optical module according to this embodiment.

The removal unit 200 is formed by connecting the latch 210 and the tab 220. The latch 210 includes two arms 111. A first end of each arm 111 serves as the connection part 111a, and second ends of the arms 111 are connected by the beam 112.

In part of each arm 111, a connection hole 213 and an opening 213a extending from the connection hole 213 are provided. The connection hole 213 is circular except for where the opening 213a is formed. According to this embodiment, the connection hole 213 has a radius r2 of approximately 1.5 mm and the opening 213a has a width We of approximately 2.2 mm.

The tab 220 includes the arms 121 at its first end to connect to the latch 210. The tab 220 further includes protrusions 222 that are provided one on the inside surface of each arm 121 to face each other. Each protrusion 222 includes a connecting part 223 and an engaging part 224 extending from the connecting part 223. That is, the connecting part 223 is between the arm 121 and the engaging part 224. The engaging part 224 has, for example, a cylindrical shape of approximately 3.5 mm in diameter, while the connecting part 223 has a flat circular shape of approximately 2.8 mm in diameter, concentric with the engaging part 224, which is partly cut off linearly on one side along the axis of the cylinder to define a cut surface 223a. The diameter of the connecting part 223, namely, a length L2 of the connecting part 223, is greater than the width Wc of the opening 213a.

According to this embodiment, a width Wd of each connecting part 223 is smaller than the width Wc of the openings 213a. Referring to FIG. 14C, the cut surface 223a extends in a direction substantially perpendicular to a lengthwise direction of the tab 220.

Figure 16A:
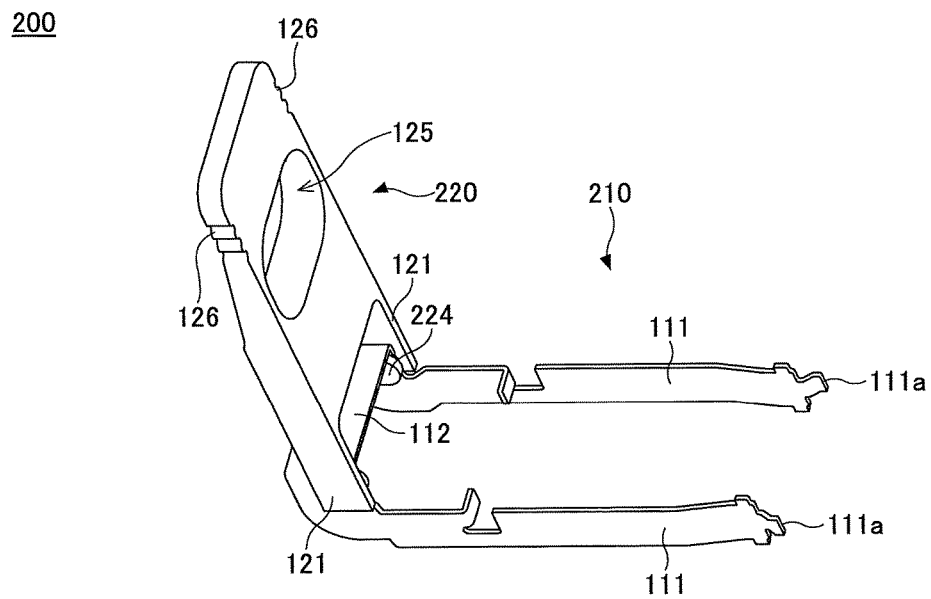
FIGS. 16A and 16B are diagrams illustrating a method of connecting a latch and a tab according to the second embodiment.

The latch 210 and the tab 220 are connected by placing the connecting parts 223 into the connection holes 213. A method of connecting the latch 210 and the tab 220 is described with reference to FIGS. 16A through 18B. FIGS. 16A, 17A and 18A are perspective views and FIGS. 16B, 17B and 18B are cross-sectional views of the latch 210 and the tab 220.

Figure 16B:
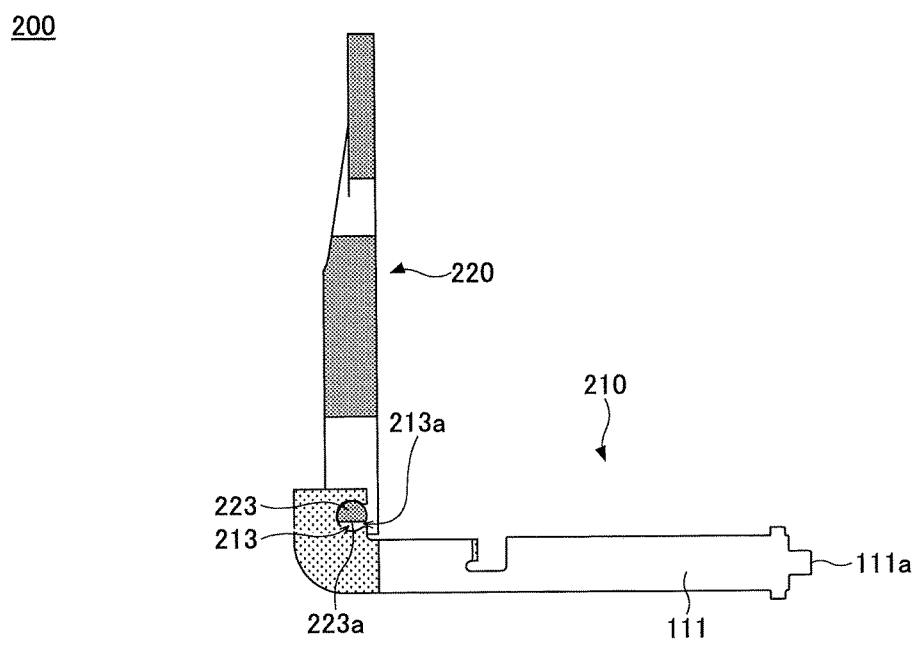
Figure 17A:
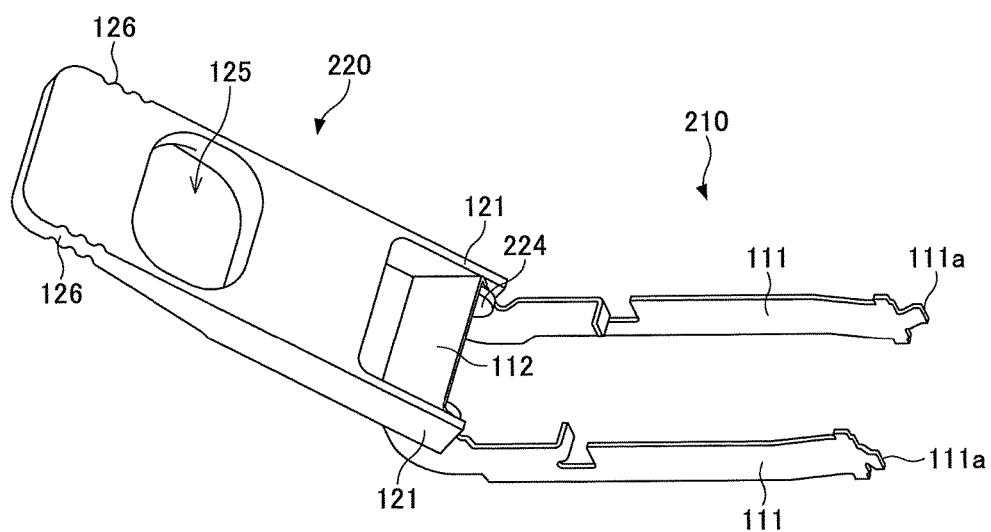
FIGS. 17A and 17B are diagrams illustrating the method of connecting a latch and a tab according to the second embodiment.

First, as illustrated in FIGS. 16A and 16B, the connecting parts 223 are placed into the connection holes 213 with the tab 220 being perpendicular to the latch 210. The connecting parts 223 are positioned on the opening 213a side of the connection holes 213 with the tab 220 being perpendicular to the latch 210. In this state, the latch 210 is substantially parallel to a direction in which the cut surfaces 223a extend. Thereafter, the tab 220 is moved leftward in FIG. 16B to place the connecting parts 223 into the connection holes 213 through the openings 213a. As the width Wd of the connecting parts 223 is smaller than the width Wc of the openings 213a, the connecting parts 223 can enter the connection holes 213 through the openings 213a.

Figure 17B:
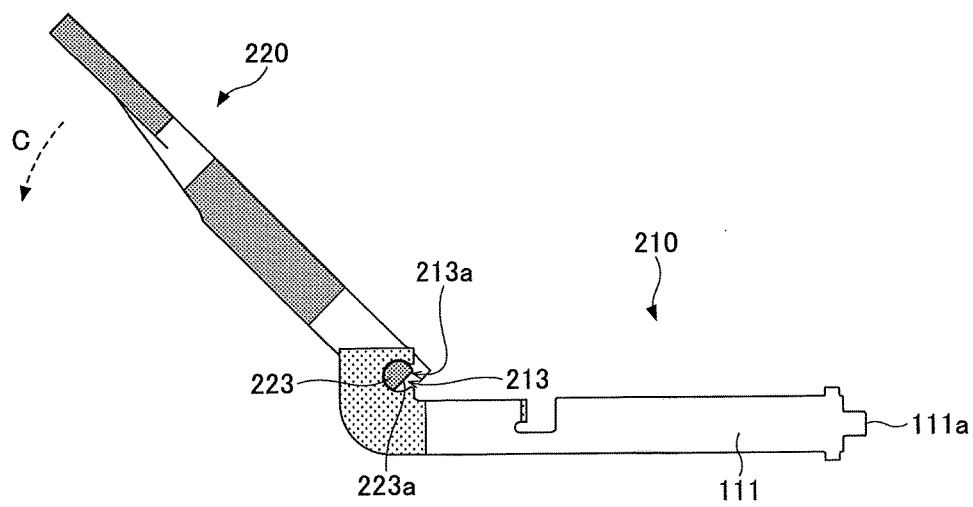

Next, as illustrated in FIGS. 17A and 17B, with the connecting parts 223 placed in the connection holes 213, the tab 220 is pivoted in direction C. Each connection hole 213 has a circular shape and each connecting part 223 is formed with a radius smaller than the radius of the connection hole 213. That is, the length L2 of the connecting part 223 is smaller than the diameter of the connection hole 213. Therefore, the tab 220 can be pivoted in direction C, while the connecting parts 223 are in the connection holes 213.

Figures 18A, 18B:
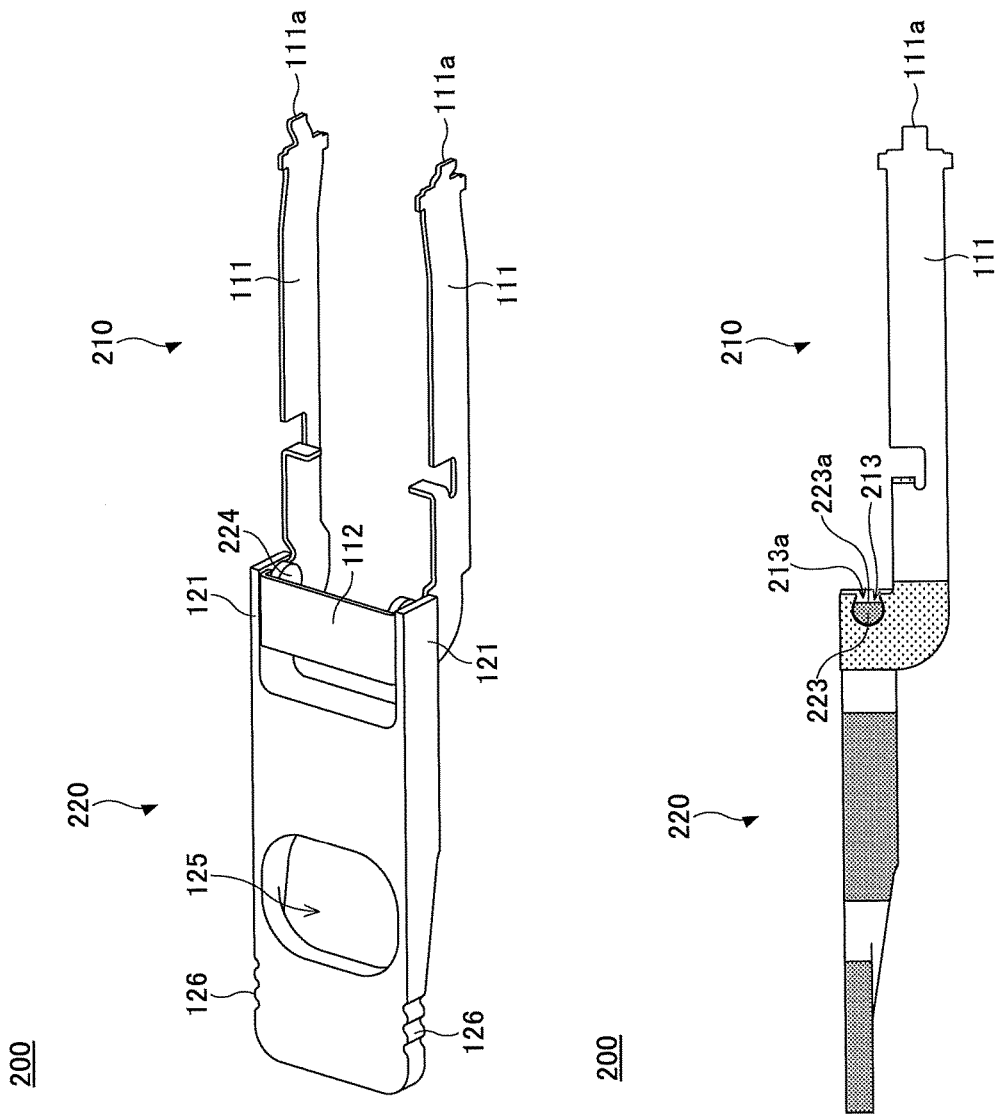
FIGS. 18A and 18B are diagrams illustrating the method of connecting a latch and a tab according to the second embodiment.

As a result, the tab 220 can be placed to be substantially parallel to the latch 210 as illustrated in FIGS. 18A and 18B. In this state, the optical module can be pulled out by inserting a finger into the hole 125.

Figure 19A:
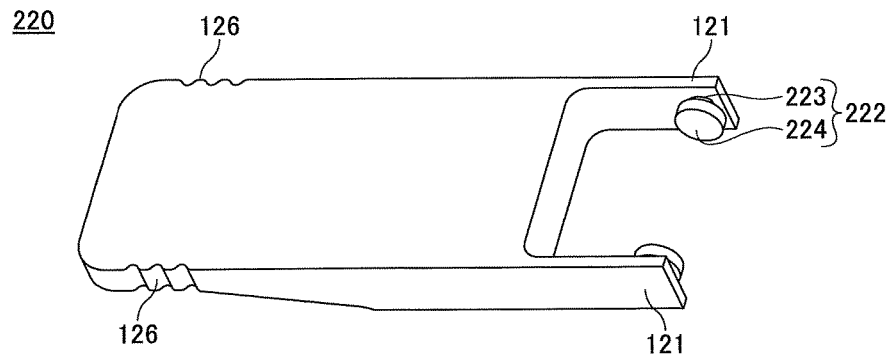
FIGS. 19A through 19C are diagrams illustrating another configuration of the tab according to the second embodiment.
Figure 19B:
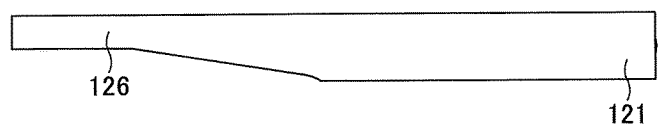
Figure 19C:
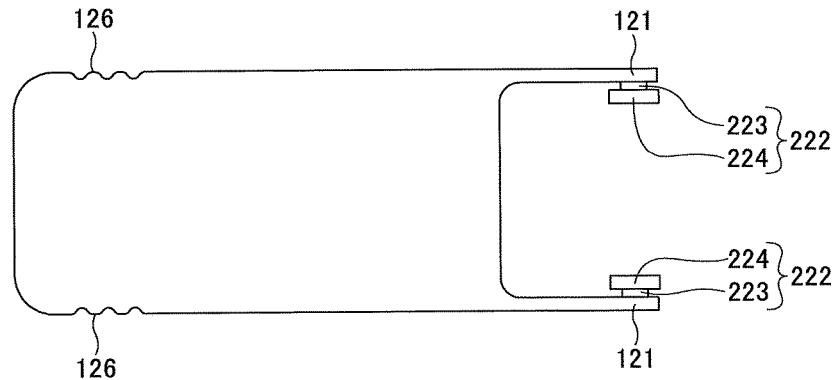

Alternatively, the optical module may be pulled out by holding the irregularities 126 without inserting a finger into the hole 125. Furthermore, the hole 125 does not have to be provided in the tab 220 as illustrated in FIGS. 19A through 19C. FIGS. 19A, 19B and 19C are a perspective view, a side view and a plan view, respectively of the tab 220 where the hole 125 is not provided.

The diameter of the engaging parts 224 is greater than the diameter of the connection holes 213. Therefore, the engaging parts 224 engage with the connection holes 213 to prevent the tab 220 from disengaging from the latch 210 in the state illustrated in FIGS. 17A, 17B, 18A, and 18B.

According to this embodiment, to disengage the tab 220 from the latch 210, the tab 220 is moved rightward after being positioned as illustrated in FIGS. 16A and 16B. Because the width Wd of the connecting parts 223 is smaller than the width We of the openings 213a, the connecting parts 223 can be easily moved out through the openings 213a.

In other respects than those described above, the second embodiment may be the same as the first embodiment.

Third Embodiment

Figure 21A:
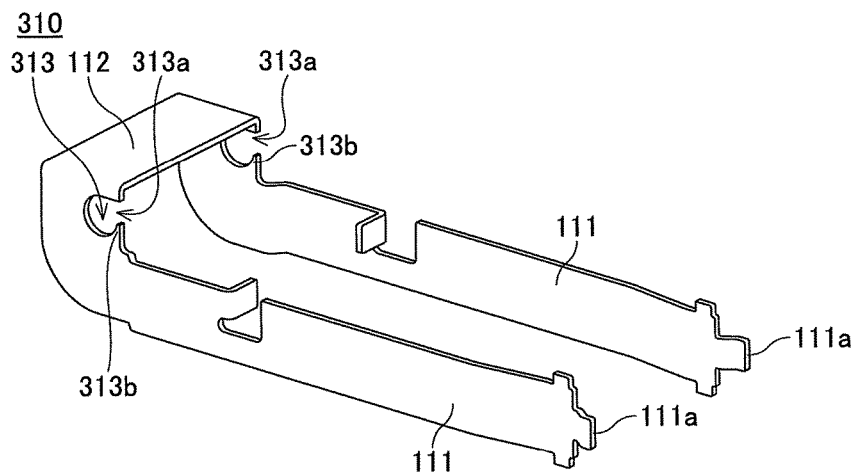
FIGS. 21A through 21C are diagrams illustrating a latch according to the third embodiment.
Figure 21B:
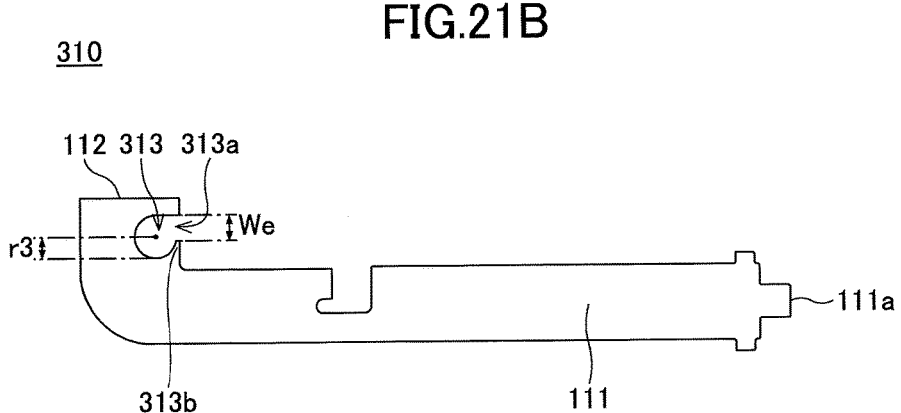
Figure 21C:
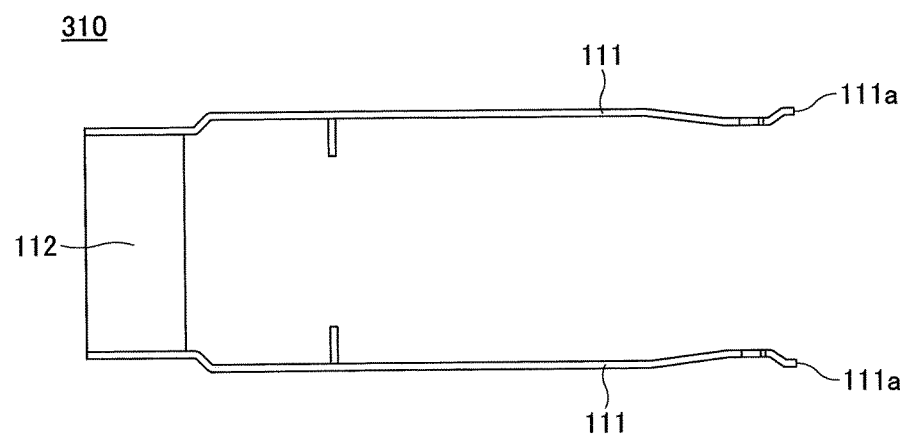
Figure 22A:
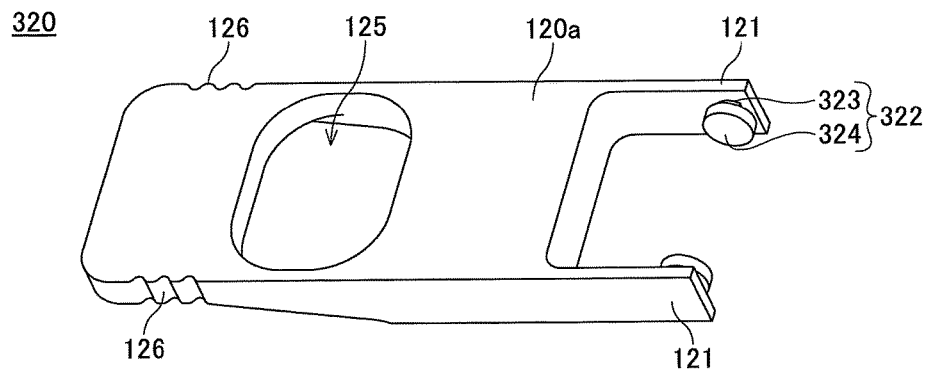
FIGS. 22A through 22C are diagrams illustrating a tab according to the third embodiment.
Figure 22B:
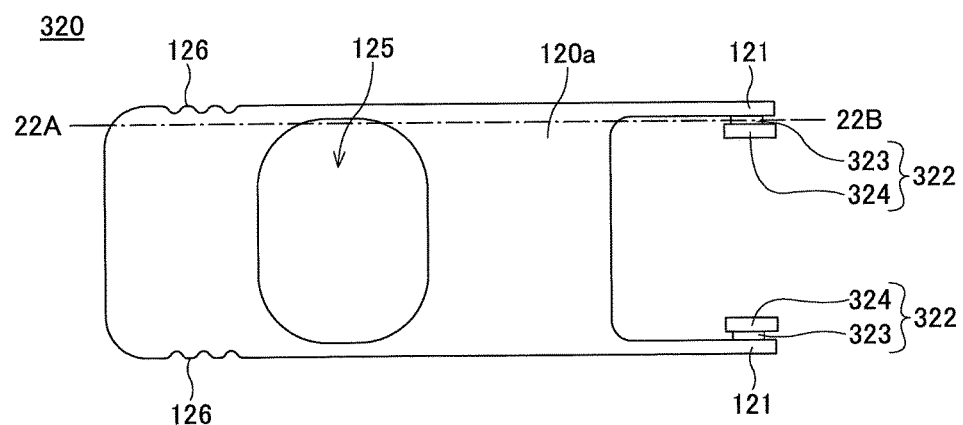
Figure 22C:
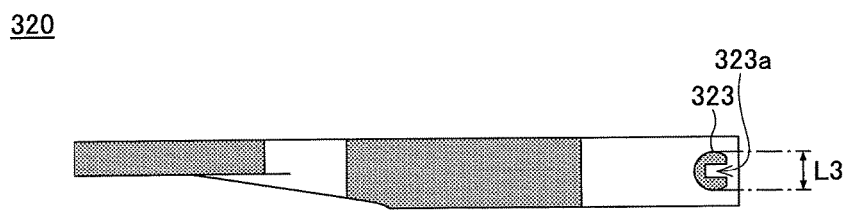

Next, a removal unit and an optical module according to a third embodiment are described with reference to FIGS. 20A through 22C. FIGS. 20A and 20B are a perspective view and a cross-sectional view, respectively, of a latch 310 and a tab 320 according to this embodiment, which are connected. FIGS. 21A, 21B and 21C are a perspective view, a side view and a plan view, respectively, of the latch 310. FIGS. 22A and 22B are a perspective view and a plan view, respectively, of the tab 320. FIG. 22C is a cross-sectional view of the tab 320, taken along the one-dot chain line 22A-22B of FIG. 22B. According to this embodiment, a removal unit 300 includes the latch 310 and the tab 320.

In part of each arm 111, a connection hole 313 and an opening 313a extending from the connection hole 313 are provided. The connection hole 313 is circular except for where the opening 313a is formed. According to this embodiment, the opening 313a is offset upward or downward relative to the connection hole 313. In the illustrated case, the opening 313a is offset upward relative to the connection hole 313. Therefore, an extension of an upper edge of the opening 313a becomes a tangent of the connection hole 313, and a protrusion 313b is formed at a lower edge of the opening 313a. The connection hole 313 has a radius r3 of approximately 1.5 mm and the opening 313a has a width We of approximately 2.2 mm.

The tab 320 includes the arms 121 at its first end to connect to the latch 310, and protrusions 322 provided one on the inside surface of each arm 121. Each protrusion 322 includes a connecting part 323 and an engaging part 324 extending from the connecting part 323. The engaging part 324 has, for example, a cylindrical shape of approximately 3.5 mm in diameter, while the connecting part 323 has a flat circular shape of approximately 2.8 mm in diameter, concentric with the engaging part 324, which is partly cut off linearly on one side along the axis of the cylinder and which is partly recessed to have a groove 323a formed therein. The groove 323a has a size of approximately 0.7 mm in width and approximately 0.7 mm in depth. The connecting part 323 is smaller than the engaging part 324.

The latch 310 and the tab 320 are connected by placing the connecting parts 323 into the connection holes 313. A method of connecting the latch 310 and the tab 320 is described with reference to FIGS. 23A through 26B. FIGS. 23A, 24A, 25A and 26A are perspective views and FIGS. 23B, 24B, 25B and 26B are cross-sectional views of the latch 310 and the tab 320, illustrating a process of connecting the latch 310 and the tab 320.

Figure 23A:
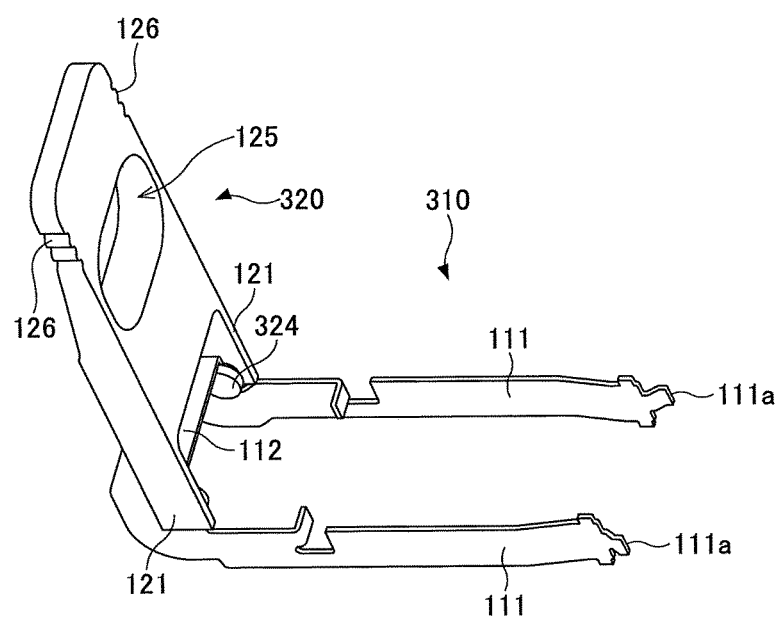
FIGS. 23A and 23B are diagrams illustrating a method of connecting a latch and a tab according to the third embodiment.
Figure 23B:
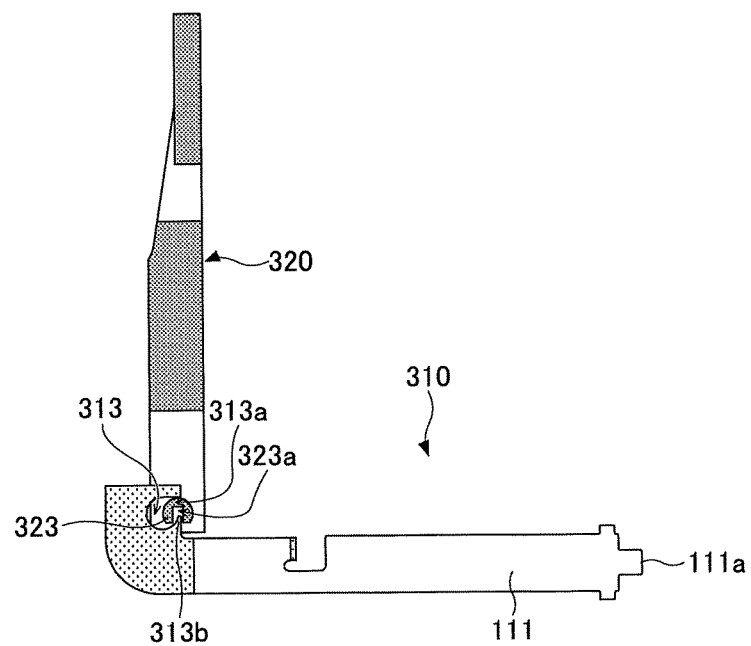

First, as illustrated in FIGS. 23A and 23B, the tab 320 is placed to be perpendicular to the latch 310, and the protrusions 313b are placed into the grooves 323a.

Figure 24A:
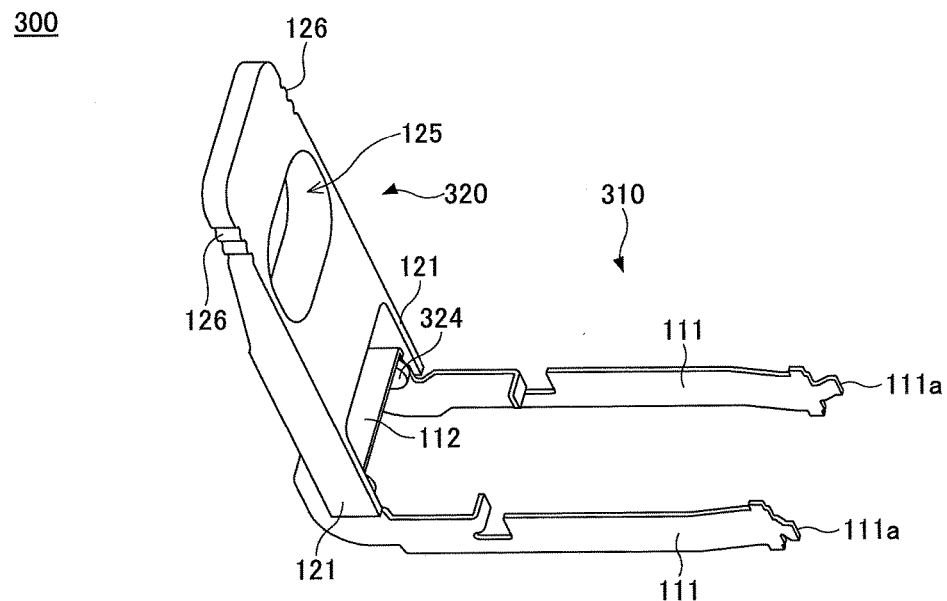
FIGS. 24A and 24B are diagrams illustrating the method of connecting a latch and a tab according to the third embodiment.
Figure 24B:
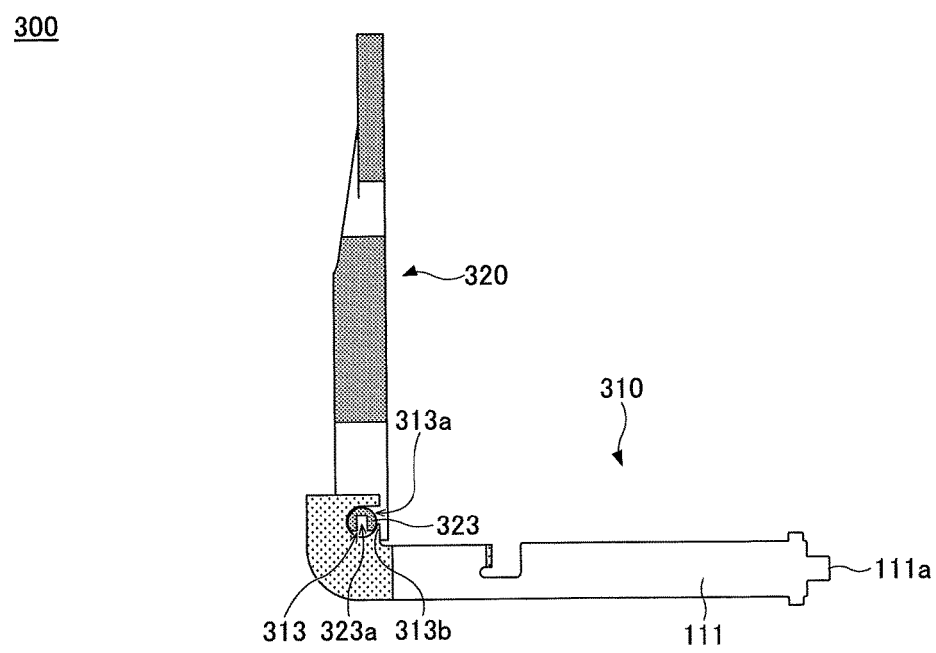

Next, as illustrated in FIGS. 24A and 24B, the connecting parts 323 are placed into the connection holes 313.

Figure 25A:
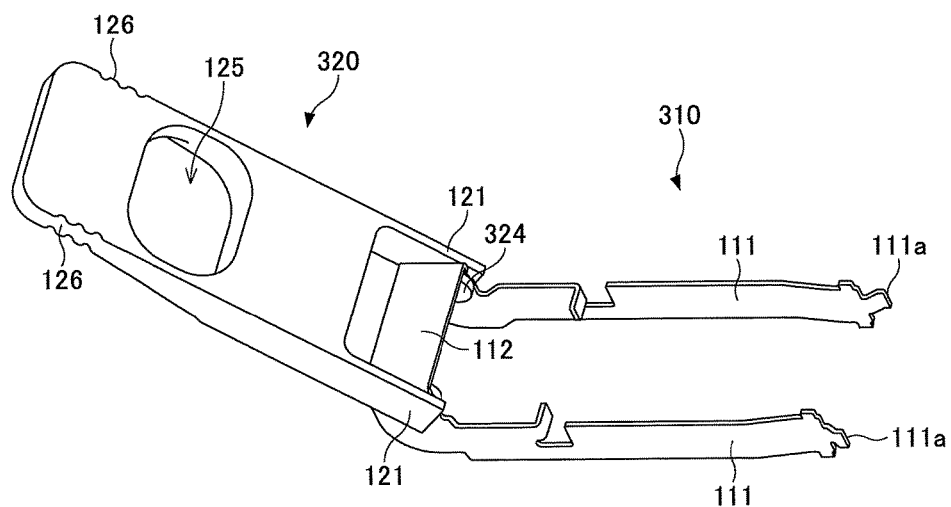
FIGS. 25A and 25B are diagrams illustrating the method of connecting a latch and a tab according to the third embodiment.
Figure 25B:
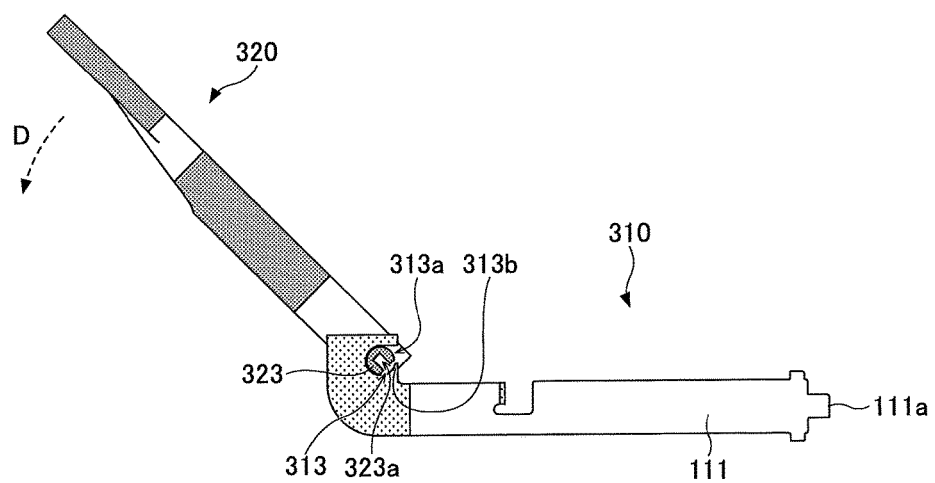
Figures 26A, 26B:
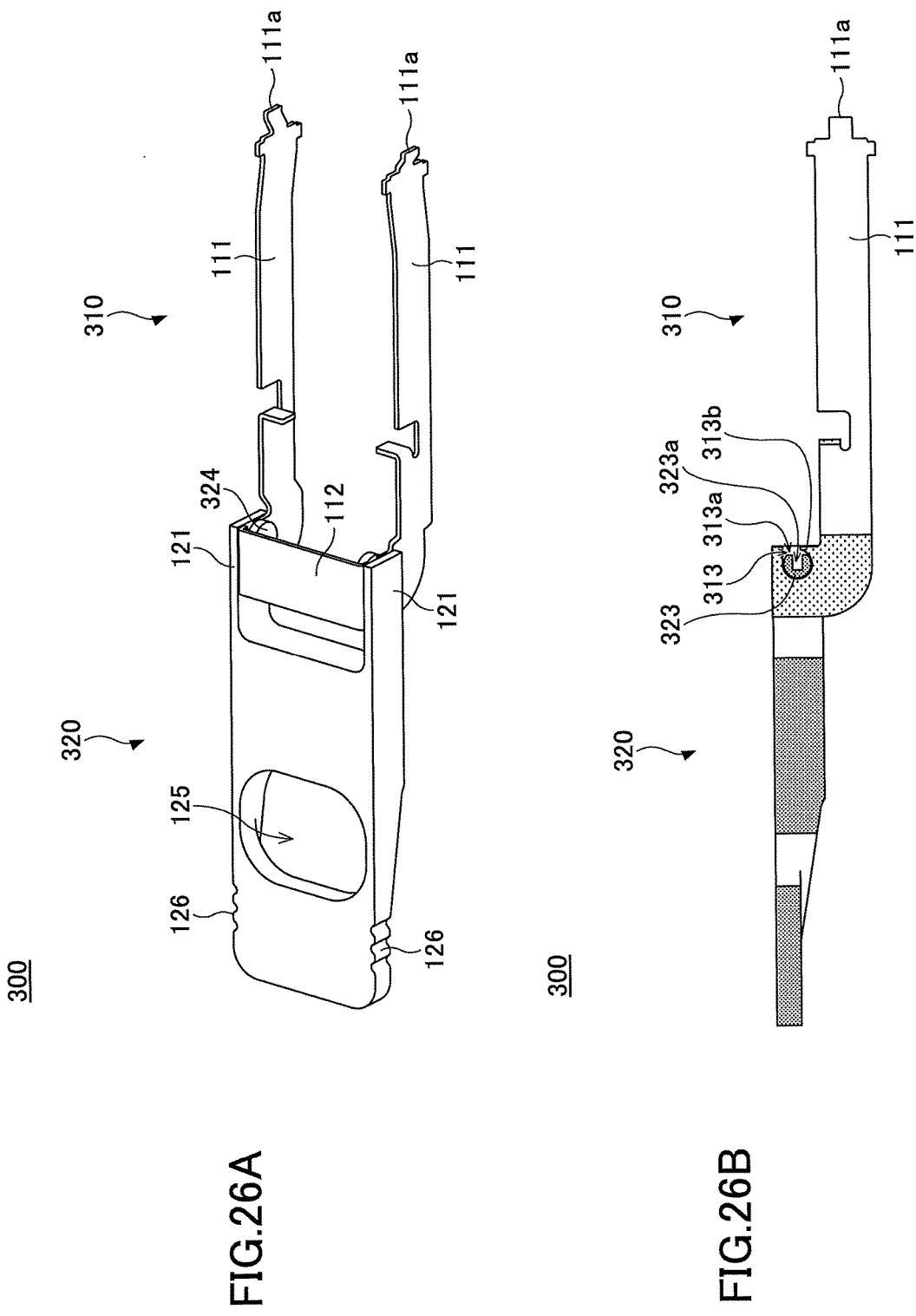
FIGS. 26A and 26B are diagrams illustrating the method of connecting a latch and a tab according to the third embodiment.

Next, as illustrated in FIGS. 25A and 25B, with the connecting parts 323 placed in the connection holes 313, the tab 320 is pivoted in direction D. Each connection hole 313 is circular except for where the opening 313a is formed, and a radius of each connecting part 323, that is, a length L3 of the connecting part 323, is smaller than the radius of the connection hole 313. Therefore, the tab 320 can be pivoted in direction D, while the connecting parts 323 are in the connection holes 313. As a result, the tab 320 can be positioned substantially parallel to the latch 310 as illustrated in FIGS. 26A and 26B.

According to this embodiment, as the diameter of the engaging parts 324 is greater than the diameter of the connection holes 313, the tab 320 is prevented from disengaging from the latch 310 in the state illustrated in FIGS. 25A, 25B, 26A and 26B.

Furthermore, according to this embodiment, the tab 320 can be easily disengaged from the latch 310 by following the process illustrated in FIGS. 23A through 26B in reverse order.

In other respects than those described above, the third embodiment may be the same as the second embodiment.

Fourth Embodiment

Figure 27A:
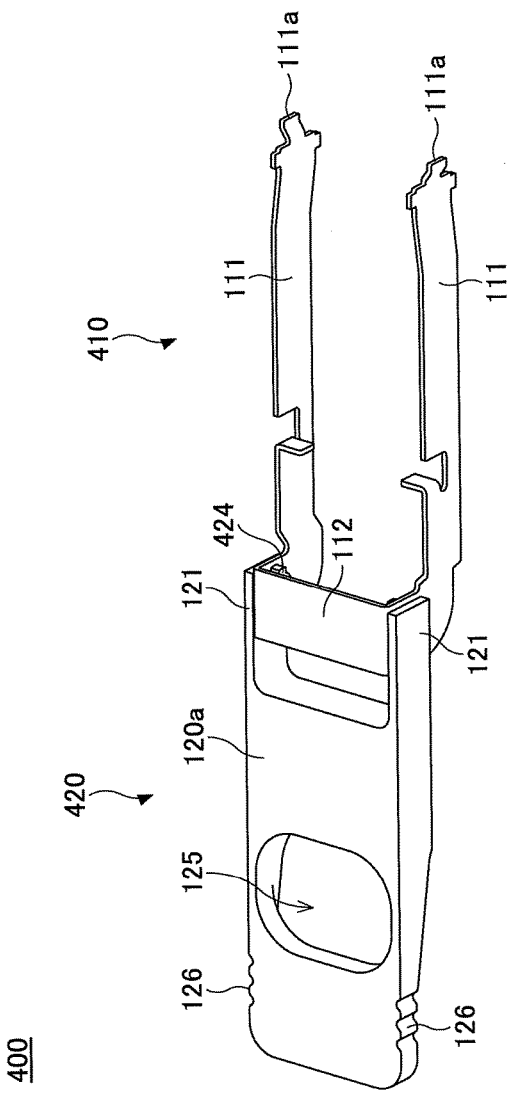
FIGS. 27A and 27B are diagrams illustrating a removal unit according to a fourth embodiment.
Figure 27B:
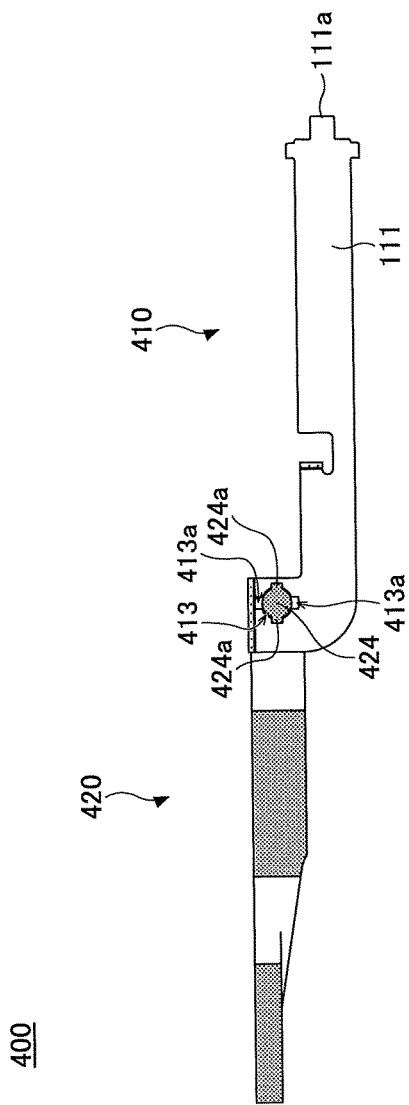
Figure 28A:
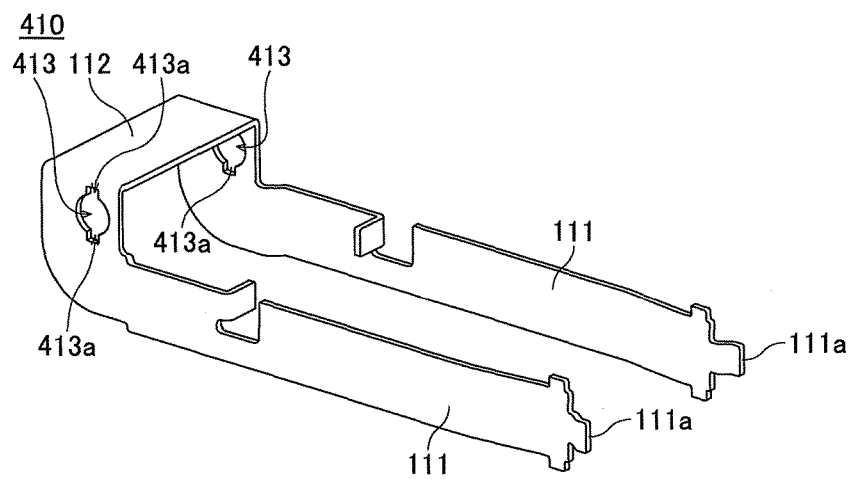
FIGS. 28A through 28C are diagrams illustrating a latch according to the fourth embodiment.
Figure 28B:
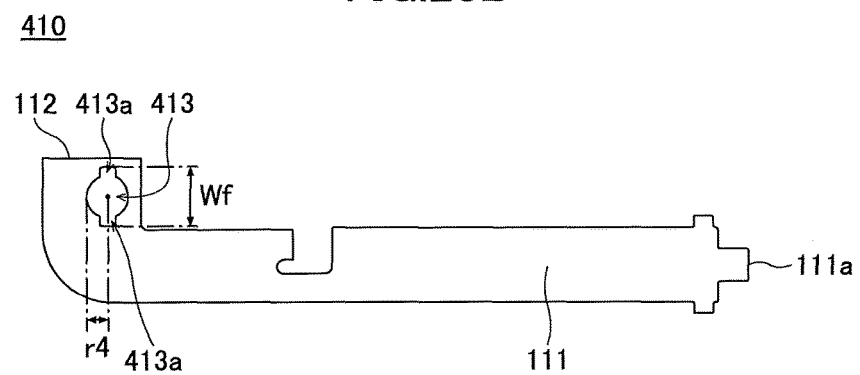
Figure 28C:
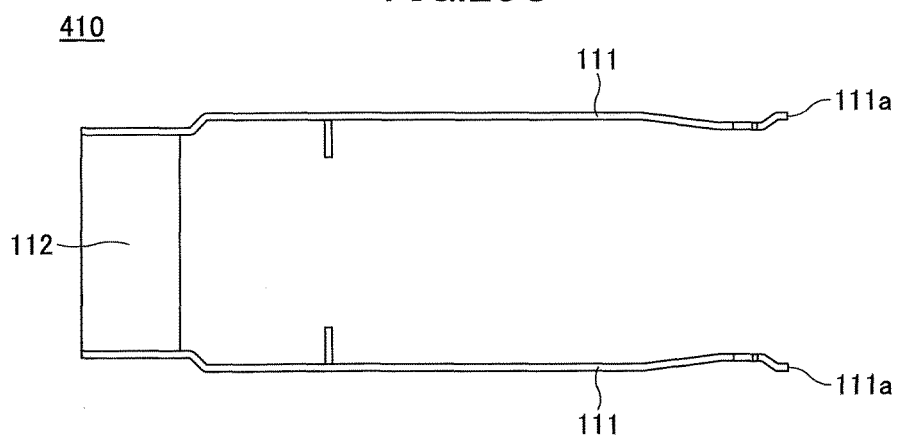
Figure 29A:
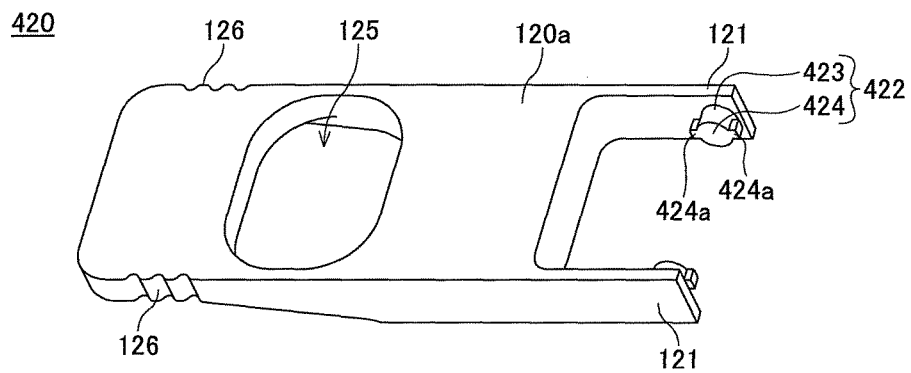
FIGS. 29A through 29C are diagrams illustrating a tab according to the fourth embodiment.
Figure 29B:
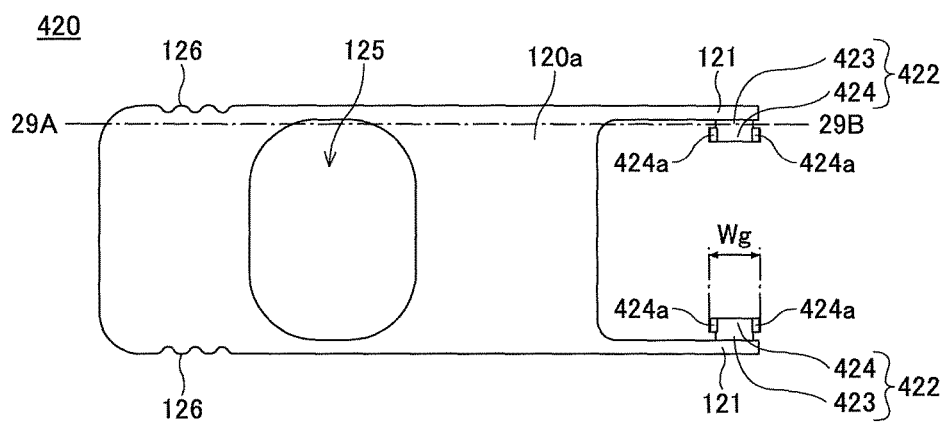
Figure 29C:
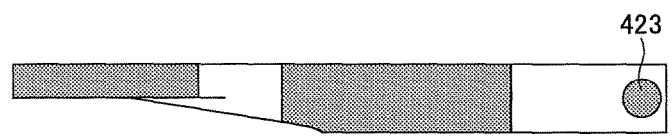

Next, a removal unit and an optical module according to a fourth embodiment are described with reference to FIGS. 27A through 29C. FIGS. 27A and 27B are a perspective view and a cross-sectional view, respectively, of a latch 410 and a tab 420 according to this embodiment, which are connected. FIGS. 28A, 28B and 28C are a perspective view, a side view and a plan view, respectively, of the latch 410. FIGS. 29A and 29B are a perspective view and a plan view, respectively, of the tab 420. FIG. 29C is a cross-sectional view of the tab 420, taken along the one-dot chain line 29A-29B of FIG. 29B.

According to this embodiment, a removal unit 400 includes the latch 410 and the tab 420.

In part of each arm 111, a circumferentially closed connection hole 413 is provided. The connection hole 413 includes a circular area and two recesses 413a that extend outward from the circular area in opposite directions perpendicular to a lengthwise direction of the latch 410. According to this embodiment, the connection hole 413 has a radius r4 of approximately 1.5 mm, and a width Wf, namely, the distance between the bottom surfaces of the recesses 413a, is approximately 3.7 mm.

The tab 420 includes the arms 121 at a first end. The tab 420 further includes protrusions 422 that are provided one on the inside surface of each arm 121. Each protrusion 422 includes a connecting part 423 and an engaging part 424 extending from the connecting part 423. The connecting part 423 is between the arm 121 and the engaging part 424. The engaging part 424 includes a flat circular portion and two protrusions 424a that protrude outward from the circular portion in opposite directions along the length of the tab 420. Alternatively, the engaging part 424 may have a polygonal portion in place of the circular portion. The connecting part 423 has a flat circular shape of approximately 2.8 mm in diameter. Alternatively, the connecting part 423 may have a polygonal shape. The circular portion of the engaging part 424 is concentric with and equal in diameter to the connecting part 423. A width Wg of the engaging part 424 where the protrusions 424a are provided is approximately 3.5 mm. Accordingly, the connecting part 423 is smaller than the engaging part 424. The diameter of the connecting part 423 is smaller than or equal to the diameter of the connection hole 413, and the width Wg of the engaging part 424 is greater than the diameter of the connection hole 413.

Figure 30A:
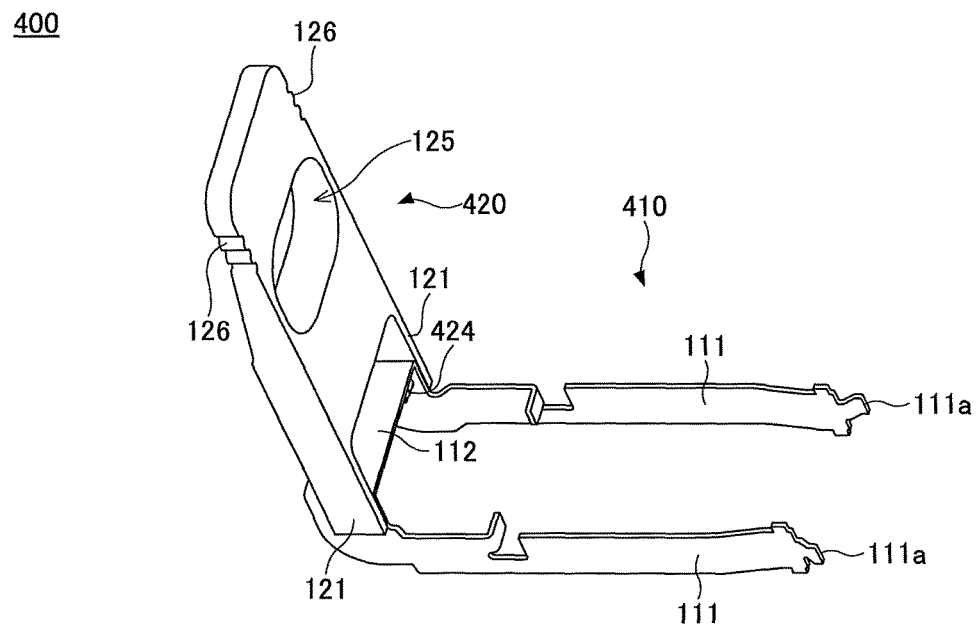
FIGS. 30A and 30B are diagrams illustrating a method of connecting a latch and a tab according to the fourth embodiment.

The latch 410 and the tab 420 are connected by placing the connecting parts 423 into the connection holes 413. A method of connecting the latch 410 and the tab 420 is described with reference to FIGS. 30A through 32B. FIGS. 30A, 31A and 32A are perspective views and FIGS. 30B, 31B and 32B are cross-sectional views of the latch 410 and the tab 420, illustrating a process of connecting the latch 410 and the tab 420.

Figure 30B:
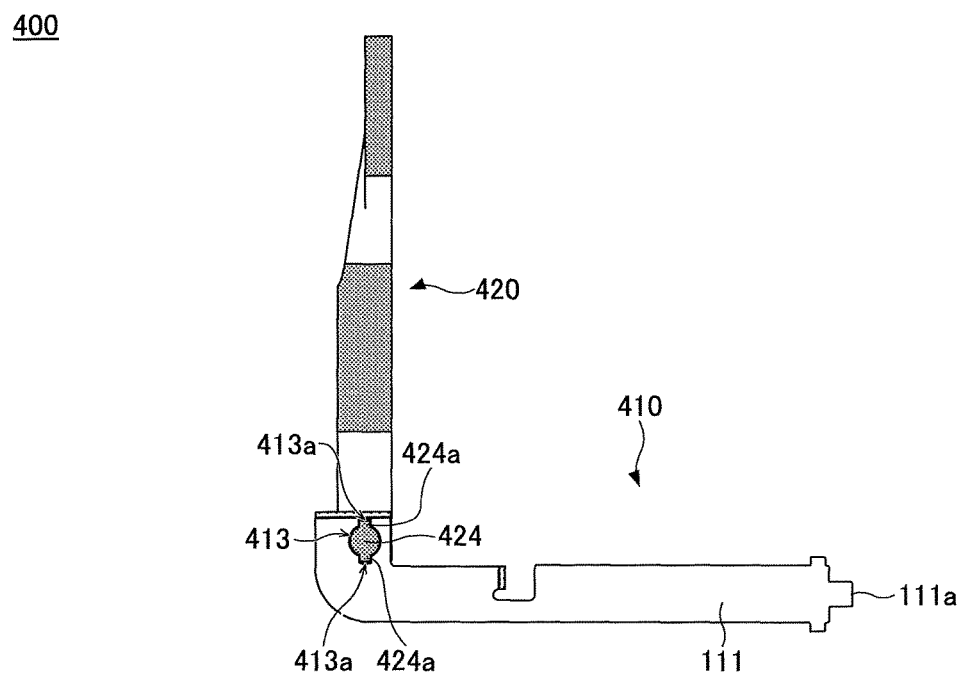
Figure 31A:
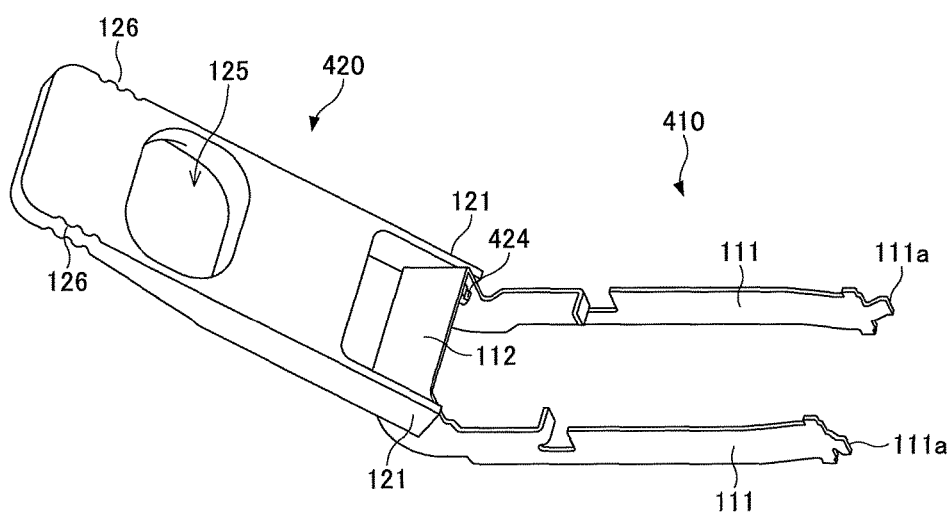
FIGS. 31A and 31B are diagrams illustrating the method of connecting a latch and a tab according to the fourth embodiment.

First, as illustrated in FIGS. 30A and 30B, the tab 420 is placed to be perpendicular to the latch 410, and the connecting parts 423 are placed into the connection holes 413. In the state where the tab 420 is perpendicular to the latch 410, the protrusions 424a can be positioned to coincide with the positions of the recesses 413a. In this state, by widening the gap between the arms 121, the engaging parts 424 are placed into the connection holes 413, and the connecting parts 423 are further placed into the connection holes 413.

Figure 31B:
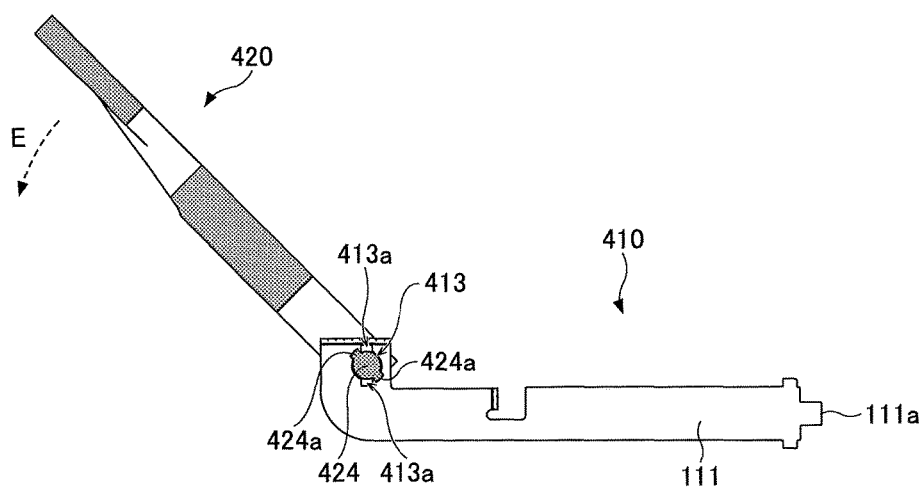
Figures 32A, 32B:
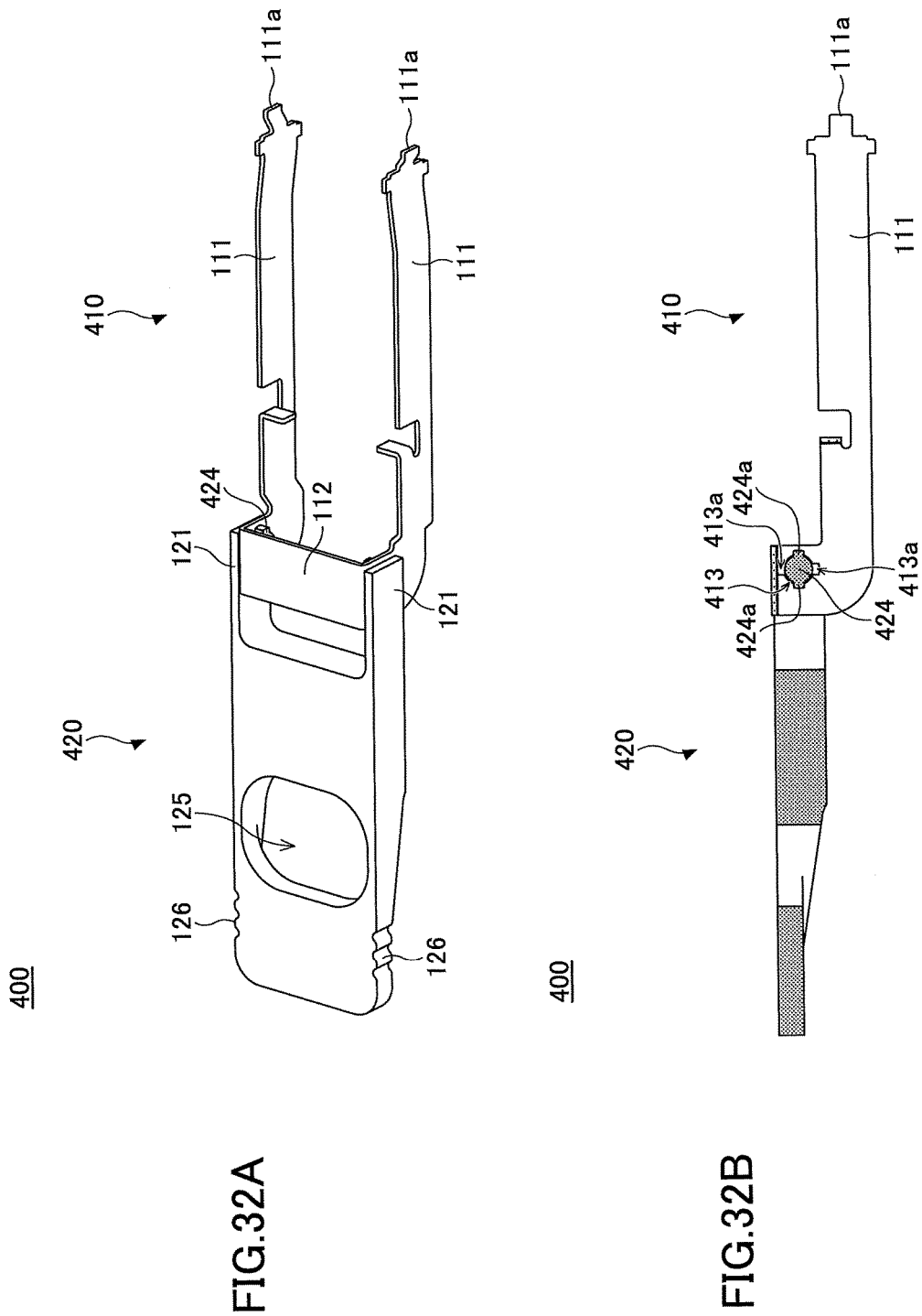
FIGS. 32A and 32B are diagrams illustrating the method of connecting a latch and a tab according to the fourth embodiment.

Next, as illustrated in FIGS. 31A and 31B, with the connecting parts 423 placed in the connection holes 413, the tab 420 is pivoted in direction E. Each connection hole 413 is circular, and each connecting part 423 has a radius smaller than the radius of the connection hole 413. Therefore, the tab 420 can be pivoted in direction E, while the connecting parts 423 are in the connection holes 413. As a result, the tab 420 can be positioned substantially parallel to the latch 410 as illustrated in FIGS. 32A and 32B.

According to this embodiment, the width Wg of a portion of each engaging part 424 where the protrusions 424a are formed is greater than the diameter of each connection hole 413 of the latch 410. Therefore, the tab 420 is prevented from disengaging from the latch 410 in the state illustrated in FIGS. 31A, 31B, 32A and 32B.

Furthermore, the tab 420 can be disengaged from the latch 410 by following the process illustrated in FIGS. 30A through 32B in reverse order and widening the gap between the arms 121.

In other respects than those described above, the fourth embodiment may be the same as the second embodiment.

Fifth Embodiment

Next, a fifth embodiment is described.

Figure 33A:
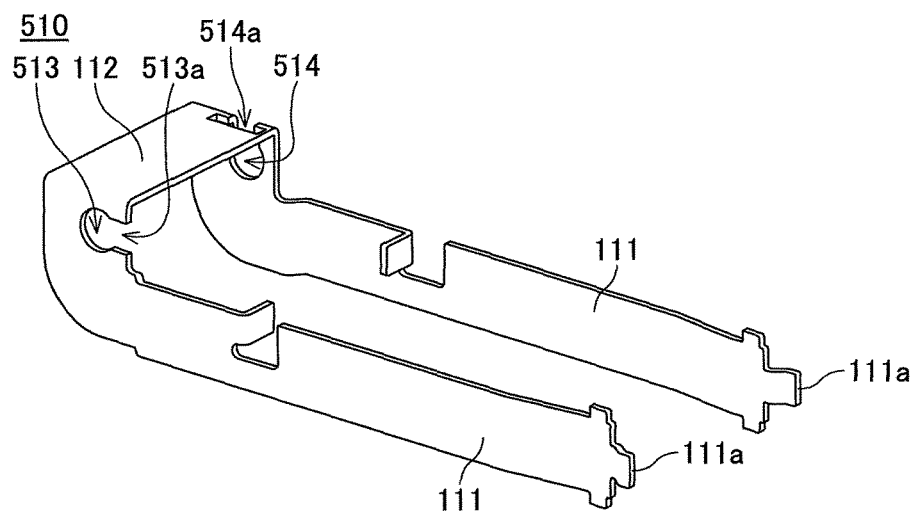
FIGS. 33A through 33C are diagrams illustrating a latch according to a fifth embodiment.
Figure 33B:
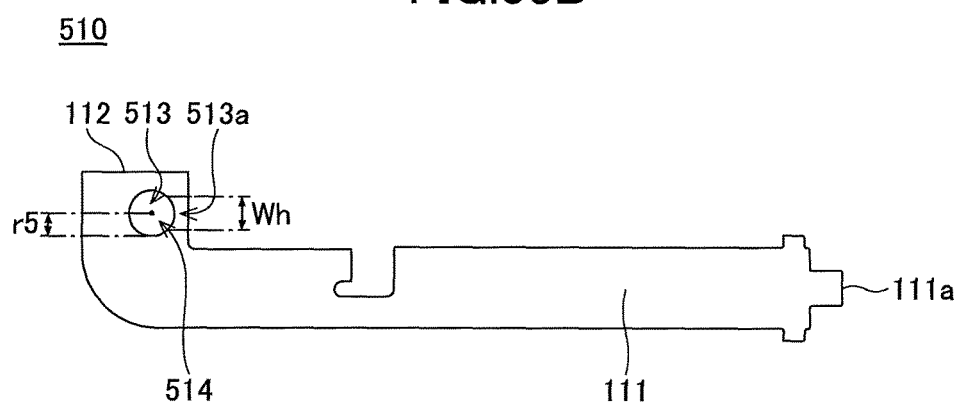
Figure 33C:
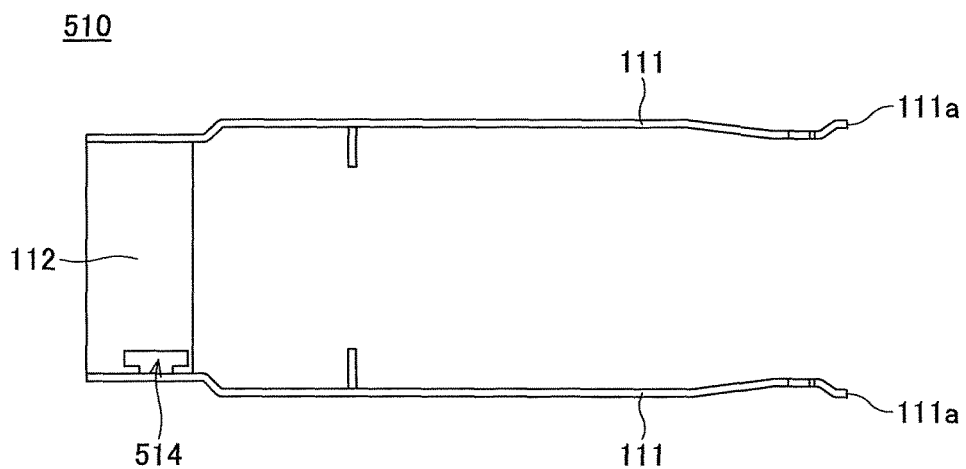

FIGS. 33A, 33B and 33C are a perspective view, a side view and a plan view, respectively, of a latch 510 according to this embodiment. FIGS. 34A through 35D are diagrams illustrating a process of connecting a latch and a tab according to this embodiment. FIGS. 34A, 34C, 35A and 35C are cross-sectional views of the latch 510 and a tab on the connection hole 513 side. FIGS. 34B, 34D, 35B and 35D are cross-sectional views of the latch 510 and a tab on the connection hole 514 side.

According to this embodiment, the positions of the openings of two connection holes provided in a latch are different. Referring to FIGS. 33A and 33B, the latch 510 includes two connection holes 513 and 514. An opening 513a of the connection hole 513 and an opening 514a of the connection hole 514 are oriented in different directions, which are substantially perpendicular to each other.

The latch 510 is configured to be connected to, for example, the tab 220 of the second embodiment.

In part of one of the arms 111, the connection hole 513 and the opening 513a extending from the connection hole 513 are provided. The connection hole 513 is circular except for where the opening 513a is formed. In part of the other of the arms 111, the connection hole 514 and the opening 514a are provided. The connection hole 514 is circular except for where the opening 514a is formed. According to this embodiment, the connection holes 513 and 514 has a radius r5 of approximately 1.5 mm, and the openings 513a and 514a have a width Wh of approximately 2.2 mm.

The latch 510 and the tab 220 are connected by placing the connecting parts 223 into the connection holes 513 and 514. A method of connecting the latch 510 and the tab 220 is described with reference to FIGS. 34A through 35D.

Figure 34A:
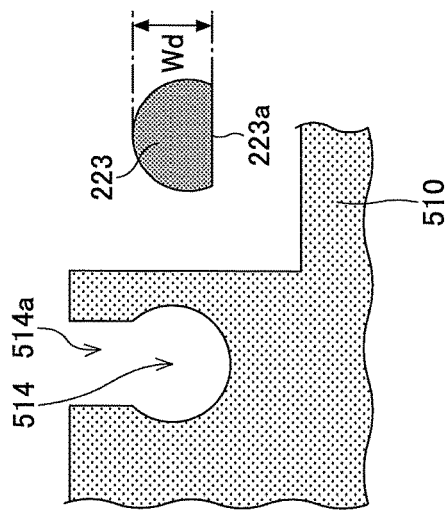
FIGS. 34A through 34D are diagrams illustrating a method of connecting a latch and a tab according to the fifth embodiment.
Figure 34B:
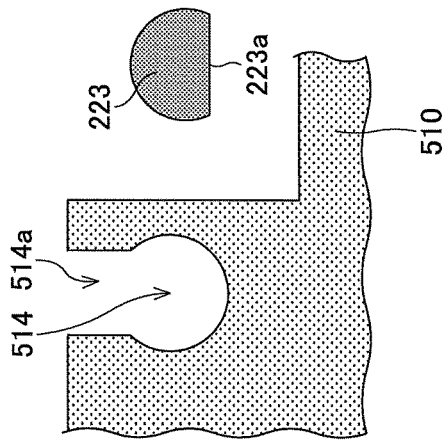

First, the tab 220 is placed to be perpendicular to the latch 510. As a result, as illustrated in FIG. 34A, a direction in which the opening 513a is oriented coincides with a direction in which the cut surface 223a of the corresponding connecting part 223 extends. In this state, as illustrated in FIG. 34B, an orientation direction of the opening 514a is perpendicular to an extending direction of the corresponding cut surface 223a.

Figure 34C:
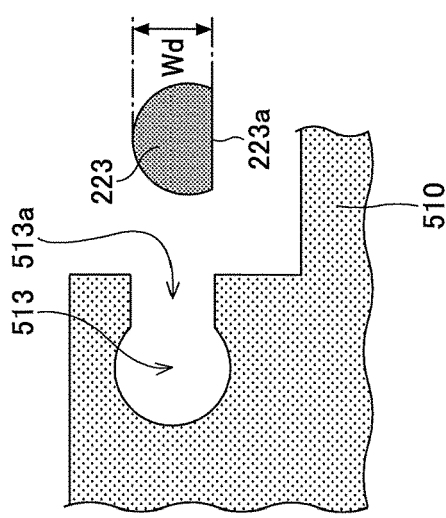
Figure 34D:
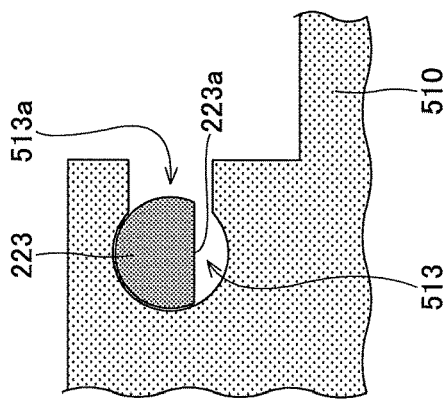

Next, as illustrated in FIGS. 34C and 34D, the connecting part 223 is placed into the connection hole 513 through the opening 513a. The width Wh of the opening 513a is approximately 2.2 mm, while the width Wd of the connecting part 223, namely, the distance between the cut surface 223a and an edge of the connecting part 223 opposite the cut surface 223a, is approximately 2.0 mm. Therefore, when the direction of the opening 513a coincides with the extension direction of the cut surface 223a, the connecting part 223 can be placed into the connection hole 513 through the opening 513a.

Next, as illustrated in FIGS. 35A and 35B, the tab 220 is pivoted approximately 90°. As a result, an orientation direction of the opening 514a coincides with an extending direction of the cut surface 223a.

Next, as illustrated in FIGS. 35C and 35D, the other connecting part 223 is placed into the connection hole 514 through the opening 514a. The width Wh of the opening 514a is approximately 2.2 mm, while the width Wd of the connecting part 223 is approximately 2.0 mm. Therefore, when the direction of the opening 514a coincides with the extension direction of the cut surface 223a, the connecting part 223 can be placed into the connection hole 514 through the opening 514a.

Thus, the connecting parts 223 can be placed into the connection holes 513 and 514. According to this embodiment, the openings 513a and 514a are provided to be open in different directions. Accordingly, the connecting parts 223 are prevented from coming off the connection holes 513 and 514 at the same time. Therefore, it is possible to prevent disengagement of the tab 220 from the latch 510.

In other respects than those described above, the fifth embodiment may be the same as the second embodiment.

Sixth Embodiment

Next, a sixth embodiment is described. According to this embodiment, two connection holes provided in a latch differ in directions in which their recesses are provided. FIGS. 36A through 37D are diagrams illustrating a process of connecting a latch and a tab according to this embodiment. FIGS. 36A, 36C, 37A and 37C are cross-sectional views of a latch 610 and a tab on the connection hole 613 side. FIGS. 36B, 36D, 37B and 37D are cross-sectional views of the latch 610 and a tab on the connection hole 614 side.

Referring to FIGS. 36A through 37D, the latch 610 includes two connection holes 613 and 614. Recesses 613a of the connection hole 613 and recesses 614a of the connection hole 614 are provided to extend in different directions, which are substantially perpendicular to each other. A removal unit according to this embodiment is formed by connecting the latch 610 and the tab 420 of the fourth embodiment.

In part of one of the arms 111, the circumferentially closed connection hole 613 is provided. The connection hole 613 includes a circular area and the two recesses 613a that extend outward from the circular area in opposite directions perpendicular to a lengthwise direction of the latch 610. In part of the other of the arms 111, the circumferentially closed connection hole 614 is provided. The connection hole 614 includes a circular area and two recesses 614a that extend outward from the circular area in opposite directions along the length of the latch 610. According to this embodiment, the connection holes 613 and 614 has a radius of approximately 1.5 mm, and each of the distance between the bottom surfaces of the recesses 613a and the distance between the bottom surfaces of the recesses 614a is approximately 3.7 mm.

The latch 610 and the tab 420 are connected by placing the engaging parts 424 into the connection holes 613 and 614 and further placing the connecting parts 423 into the connection holes 613 and 614. A method of connecting the latch 610 and the tab 420 is described with reference to FIGS. 36A through 37D.

Figures 36A, 36B:
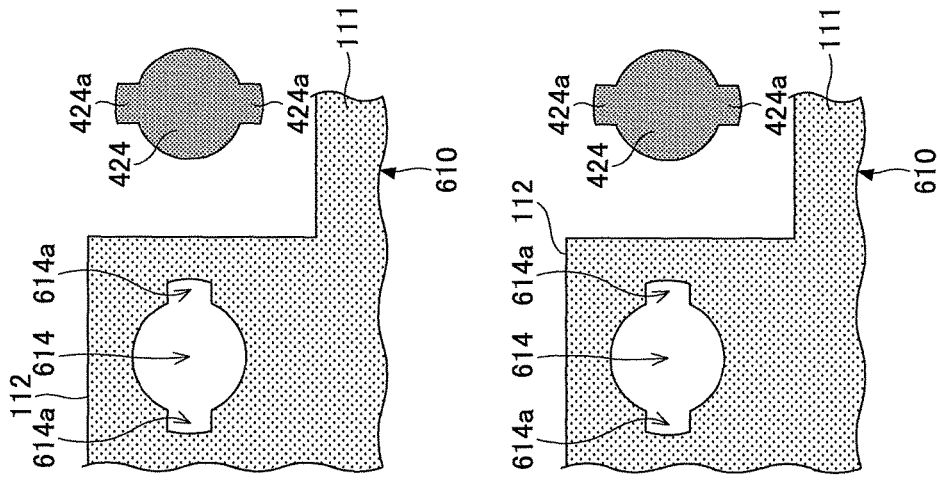
FIGS. 36A through 36D are diagrams illustrating a method of connecting a latch and a tab according to a sixth embodiment.

First, the tab 420 is placed to be perpendicular to the latch 610. As a result, as illustrated in FIGS. 36A and 36B, a direction in which the two recesses 613a are provided coincides with a direction in which the protrusions 424a of the corresponding engaging part 424 are provided. In this state, a direction in which the two recesses 614*a* are provided is perpendicular to a direction in which the protrusions 424*a* are provided.

Figures 36C, 36D:
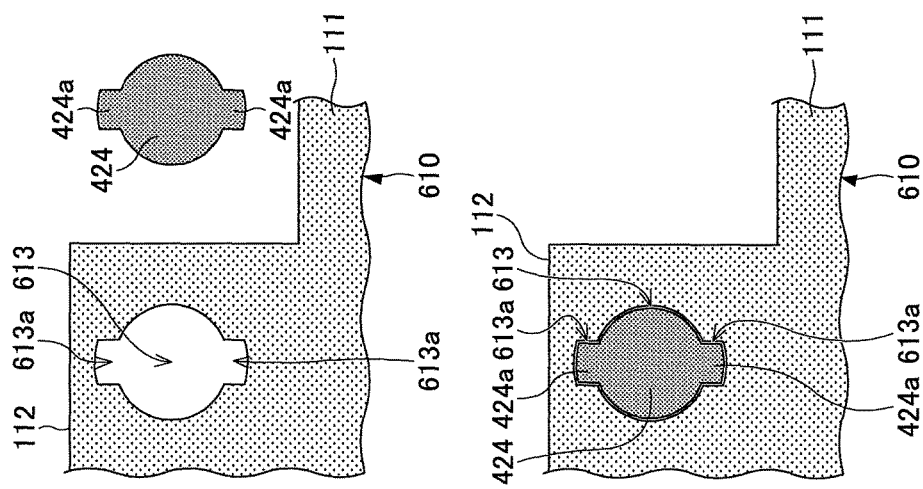

Next, as illustrated in FIGS. 36C and 36D, the engaging part 424 and connecting part 423 are placed into the connection hole 613. A direction in which the recesses 613*a* are provided coincides with a direction in which the protrusions 424*a* are provided, and the connection hole 613 is larger than the engaging part 424. Therefore, the engaging part 424 and the connecting part 423 can be placed into the connection hole 613.

Next, as illustrated in FIGS. 37A and 37B, the tab 420 is pivoted approximately 90°. As a result, a direction in which the recesses 614*a* are provided coincides with a direction in which the protrusions 424*a* of the corresponding engaging part 424 are provided.

Next, as illustrated in FIGS. 37C and 37D, the other engaging part 424 and the other connecting part 423 are placed into the connection hole 614. A direction in which the recesses 614*a* are provided coincides with a direction in which the protrusions 424*a* are provided, and the connection hole 614 is larger than the engaging part 424. Therefore, the engaging part 424 and the connecting part 423 can be placed into the connection hole 614.

As a result, the connecting parts 423 can be placed into the connection holes 613 and 614. According to this embodiment, a direction in which the recesses 613*a* are provided and a direction in which the recesses 614*a* are provided are perpendicular to each other. Accordingly, the engaging parts 424 are prevented from coming off the connection holes 613 and 614 at the same time. Therefore, it is possible to prevent disengagement of the tab 420 from the latch 610.

In other respects than those described above, the sixth embodiment may be the same as the fourth embodiment.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A removal unit comprising:
   a latch including latch arms each including a connection hole and an opening extending from the connection hole and being smaller than the connection hole, the latch arms each including an end to be attached to a housing of a connector; and
   a tab separably connectable to the latch, the tab including
      a body;
      tab arms extending from the body; and
      protrusions provided on the tab arms to protrude toward each other,
      the protrusions each including
         a connecting part provided on the tab arm, and configured to be placed into the connection hole, the connecting part having a width in a first direction smaller than a width of the opening and a length in a second direction perpendicular to the first direction smaller than a diameter of the connection hole and greater than the width of the opening; and
         an engaging part extending from the connecting part, the engaging part being larger than the connection hole.

2. The removal unit as claimed in claim 1, wherein
   the connecting part has a cylindrical shape that is partly cut off, and
   the engaging part has a cylindrical shape having a diameter greater than the diameter of the connection hole.

3. The removal unit as claimed in claim 1, wherein the opening of one of the latch arms and the opening of the other of the latch arms are oriented in different directions.

4. A removal unit comprising:
   a latch including
      a beam; and
      latch arms each including a first end to be attached to a housing of a connector and a second end connected to the beam, the latch arms each including a connection hole, the connection hole including a circular area and a recess extending outward from the circular area; and
   a tab separably connectable to the latch, the tab including
      a body;
      tab arms extending from the body; and
      protrusions provided on the tab arms to protrude toward each other,
      the protrusions each including
         a connecting part provided on the tab arm, and configured to be placed into the connection hole, the connecting part having a diameter smaller than a diameter of the connection hole; and
         an engaging part extending from the connecting part, the engaging part including a first portion having a cylindrical or a polygonal shape, and a protrusion protruding outward from the first portion, the first portion having a diameter smaller than the diameter of the connection hole, wherein a distance between the protrusion and a portion of the engaging part opposite the protrusion is greater than the diameter of the connection hole.

5. The removal unit as claimed in claim 4, wherein the recess of the connection hole of one of the latch arms and the recess of the connection hole of the other of the latch arms are oriented in different directions.

* * * * *